United States Patent
Hutton

(10) Patent No.: US 9,832,222 B2
(45) Date of Patent: Nov. 28, 2017

(54) ANTI-MALWARE MOBILE CONTENT DATA MANAGEMENT APPARATUS AND METHOD

(71) Applicant: Samuel Harrison Hutton, Herts (GB)

(72) Inventor: Samuel Harrison Hutton, Herts (GB)

(73) Assignee: GLASSWALL (IP) LIMITED, London (GB)

( * ) Notice: Subject to any disclaimer, the term of this patent is extended or adjusted under 35 U.S.C. 154(b) by 433 days.

(21) Appl. No.: 14/504,666

(22) Filed: Oct. 2, 2014

(65) Prior Publication Data

US 2015/0101011 A1    Apr. 9, 2015

(30) Foreign Application Priority Data

Oct. 4, 2013 (GB) .................................. 1317607.8

(51) Int. Cl.
*H04L 29/06*     (2006.01)
*G06F 21/56*     (2013.01)
(Continued)

(52) U.S. Cl.
CPC ............ *H04L 63/145* (2013.01); *G06F 21/56* (2013.01); *G06F 21/567* (2013.01); *H04L 51/12* (2013.01);
(Continued)

(58) Field of Classification Search
CPC ..... G06F 21/55; G06F 21/56; H04L 63/1408; H04L 63/1416; H04L 63/107; H04L 63/102

See application file for complete search history.

(56) References Cited

U.S. PATENT DOCUMENTS

| | | |
|---|---|---|
| 5,050,212 A | 9/1991 | Dyson |
| 5,649,095 A | 7/1997 | Cozza |

(Continued)

FOREIGN PATENT DOCUMENTS

| | | |
|---|---|---|
| DE | 10235819 A1 | 2/2004 |
| EP | 0751643 A1 | 1/1997 |

(Continued)

OTHER PUBLICATIONS

Glasswall Solutions Ltd., 2012, "How it Works," glasswallsolutions.com, available from http://web.archive/org/web/20121015004110/http://www.glasswallsolutions.com/how-it-works, dated Oct. 15, 2012, 1 pages.

(Continued)

*Primary Examiner* — Hadi Armouche
*Assistant Examiner* — Hee Song
(74) *Attorney, Agent, or Firm* — Marger Johnson

(57) ABSTRACT

There is provided an anti-malware mobile content data management apparatus, for use in managing content data within an input electronic file containing content data to be sent over a wireless network including at least one mobile device being served by the wireless network, at least one tokenizer to tokenize the content data contained within the input electronic file into a tagged generic representation of the content data, a content management engine to apply a predetermined content management policy to the tagged generic representation of the content data to form content-managed tagged generic content data and a validator to create validated content-managed content data by being arranged to ensure the content-managed content data represented in the content-managed tagged generic representation conforms to any predefined limits and rules applied to each form of content data appearing in the content data of the input electronic file, wherein an output of the validator is (Continued)

operably coupled to the wireless network, and arranged to provide a substitute output electronic file derived from the validated content-managed content data. There is also provided an anti-malware mobile content data management method, wireless network and mobile device.

39 Claims, 8 Drawing Sheets

(51) Int. Cl.
    *H04L 12/58*     (2006.01)
    *H04W 12/12*     (2009.01)
    *H04L 29/08*     (2006.01)

(52) U.S. Cl.
    CPC ..... *H04W 12/12* (2013.01); *G06F 2221/2111* (2013.01); *G06F 2221/2115* (2013.01); *H04L 67/04* (2013.01)

(56) References Cited

U.S. PATENT DOCUMENTS

| | | | |
|---|---|---|---|
| 5,655,130 A | 8/1997 | Dodge et al. | |
| 5,745,897 A | 4/1998 | Perkins et al. | |
| 5,832,208 A | 11/1998 | Chen et al. | |
| 5,951,698 A | 9/1999 | Chen et al. | |
| 6,144,934 A | 11/2000 | Stockwell et al. | |
| 6,336,124 B1 | 1/2002 | Alam et al. | |
| 6,401,210 B1 | 6/2002 | Templeton | |
| 6,493,761 B1 | 12/2002 | Baker et al. | |
| 6,697,950 B1 | 2/2004 | Ko | |
| 6,807,632 B1 | 10/2004 | Carpentier et al. | |
| 6,922,827 B2 | 7/2005 | Vasilik et al. | |
| 7,093,135 B1 | 8/2006 | Radatti et al. | |
| 7,225,181 B2 | 5/2007 | Tsuda | |
| 7,240,279 B1 | 7/2007 | Chartier et al. | |
| 7,269,733 B1 | 9/2007 | O'Toole, Jr. | |
| 7,496,963 B2 | 2/2009 | Shipp | |
| 7,607,172 B2 | 10/2009 | Zurko et al. | |
| 7,636,856 B2 | 12/2009 | Gheorghescu et al. | |
| 7,664,754 B2 | 2/2010 | Shipp | |
| 7,685,174 B2 | 3/2010 | Koestler | |
| 7,730,467 B1* | 6/2010 | Hejlsberg | G06F 17/2247 717/142 |
| 7,756,834 B2 | 7/2010 | Masters et al. | |
| 8,185,954 B2 | 5/2012 | Scales | |
| 8,533,840 B2 | 9/2013 | Redlich et al. | |
| 8,590,016 B2* | 11/2013 | Kim | G06F 21/568 709/206 |
| 8,683,584 B1 | 3/2014 | Daswani et al. | |
| 2002/0004908 A1 | 1/2002 | Galea | |
| 2002/0072926 A1 | 6/2002 | Morita et al. | |
| 2002/0073330 A1 | 6/2002 | Chandnani et al. | |
| 2002/0174185 A1 | 11/2002 | Rawat et al. | |
| 2002/0178396 A1 | 11/2002 | Wong et al. | |
| 2002/0184555 A1 | 12/2002 | Wong et al. | |
| 2003/0046128 A1 | 3/2003 | Heinrich | |
| 2003/0079142 A1 | 4/2003 | Margalit et al. | |
| 2003/0079158 A1 | 4/2003 | Tower et al. | |
| 2003/0120949 A1 | 6/2003 | Redlich et al. | |
| 2003/0145213 A1 | 7/2003 | Carbone | |
| 2003/0163732 A1 | 8/2003 | Parry | |
| 2003/0163799 A1 | 8/2003 | Vasilik et al. | |
| 2003/0196104 A1 | 10/2003 | Baber et al. | |
| 2003/0229810 A1 | 12/2003 | Bango | |
| 2004/0008368 A1 | 1/2004 | Plunkett et al. | |
| 2004/0049687 A1 | 3/2004 | Orsini et al. | |
| 2004/0054498 A1 | 3/2004 | Shipp | |
| 2004/0064515 A1 | 4/2004 | Hockey | |
| 2004/0181543 A1 | 9/2004 | Wu et al. | |
| 2004/0199594 A1 | 10/2004 | Radatti et al. | |
| 2004/0230903 A1 | 11/2004 | Elza et al. | |
| 2005/0027787 A1* | 2/2005 | Kuhn | H04L 12/66 709/200 |
| 2005/0071477 A1 | 3/2005 | Evans et al. | |
| 2005/0081057 A1 | 4/2005 | Cohen et al. | |
| 2005/0108554 A1* | 5/2005 | Rubin | G06F 8/427 713/187 |
| 2005/0132206 A1 | 6/2005 | Palliyil et al. | |
| 2005/0132227 A1 | 6/2005 | Reasor et al. | |
| 2005/0138110 A1 | 6/2005 | Redlich et al. | |
| 2005/0149720 A1 | 7/2005 | Gruper et al. | |
| 2005/0177543 A1* | 8/2005 | Chen | G06F 17/2229 |
| 2005/0193070 A1 | 9/2005 | Brown et al. | |
| 2005/0246159 A1 | 11/2005 | Perla et al. | |
| 2005/0278318 A1 | 12/2005 | Vasilik et al. | |
| 2006/0015747 A1 | 1/2006 | Van de Ven | |
| 2006/0037079 A1 | 2/2006 | Midgley | |
| 2006/0044605 A1 | 3/2006 | Schneider et al. | |
| 2006/0195451 A1 | 4/2006 | Smith et al. | |
| 2006/0095971 A1 | 5/2006 | Costea et al. | |
| 2006/0230452 A1 | 10/2006 | Field | |
| 2007/0079379 A1 | 4/2007 | Sprosts et al. | |
| 2007/0083929 A1 | 4/2007 | Sprosts et al. | |
| 2007/0277238 A1 | 11/2007 | Margalit et al. | |
| 2009/0138972 A1 | 5/2009 | Scales | |
| 2009/0178144 A1 | 7/2009 | Redlich et al. | |
| 2009/0210936 A1 | 8/2009 | Omar et al. | |
| 2009/0254572 A1 | 10/2009 | Redlich et al. | |
| 2009/0254992 A1 | 10/2009 | Schultz et al. | |
| 2009/0296657 A1 | 12/2009 | Omar et al. | |
| 2010/0054278 A1 | 3/2010 | Stolfo et al. | |
| 2010/0153507 A1 | 6/2010 | Wei et al. | |
| 2010/0154063 A1 | 6/2010 | Hutton et al. | |
| 2011/0116540 A1* | 5/2011 | O'Connor | H04N 5/44543 375/240.02 |
| 2011/0213783 A1 | 9/2011 | Keith, Jr. | |
| 2013/0006701 A1 | 1/2013 | Guven et al. | |
| 2015/0215332 A1 | 7/2015 | Curcic et al. | |

FOREIGN PATENT DOCUMENTS

| | | |
|---|---|---|
| EP | 1022639 A2 | 7/2000 |
| EP | 1122932 A2 | 8/2001 |
| EP | 1180880 A1 | 2/2002 |
| EP | 1560112 A1 | 8/2005 |
| EP | 1657662 A2 | 5/2006 |
| GB | 2357939 A | 7/2001 |
| GB | 2427048 A | 12/2006 |
| GB | 2444514 A | 6/2008 |
| JP | 11224190 | 8/1999 |
| JP | 2000222202 | 8/2000 |
| JP | 2002259187 | 9/2002 |
| JP | 2006127497 | 5/2006 |
| WO | 0126004 A2 | 4/2001 |
| WO | 03/017141 A1 | 2/2003 |
| WO | 2004/107684 A1 | 12/2004 |
| WO | 2005/008457 A1 | 1/2005 |
| WO | 2006/047163 A2 | 5/2006 |

OTHER PUBLICATIONS

UK Search Report and Examination Opinion for Application No. GB1317607.8, dated Feb. 21, 2014, 8 pages.
Apr. 13, 2006 Search Report in connection with counterpart British patent application No. GB0511749.4.
Apr. 16, 2012 European official action in connection with European patent application No. 06744158.4.
Canadian official action dated Feb. 21, 2013 in corresponding Canadian application No. 2,611,227.
"Checking of Incoming Files for Macro Viruses," Online 2004, retrieved from the Internet: http://www.bsi.de/english/gshb/manuals/s04044.html.
English translation of Mar. 21, 2012 Japanese official action in connection with a counterpart JP application.
Feb. 15, 2011 official action in connection with European patent application No. 06744158.4.
Great Britain search report in connection with Great Britain patent application No. GB624224.2.

(56) References Cited

OTHER PUBLICATIONS

"MailStreet Features and Benefits," Apr. 22, 2004, retrieved from the Internet: http://web.archive.org/web/2004042104456/http://www.mailstreet.com/defender/features.asp.
Oct. 21, 2005 search report in connection with counterpart British patent application No. GB0511749.4.
Oct. 4, 2006 international search report in connection with counterpart application No. PCT/GB2006/002107.
Saito, Tado, et al. (1993) "Protection Against Trojan Horses by Source Code Analysis," Electronics and Communication in Japan-Fundamental Electronic Science, Part 3, vol. 77, No. 1, pp. 11-18.
Salamone, Salvatore (1992), "A Magic Bullet for Netware Viruses. Untouchable Network NLM Can Detect and Eliminate Known and Unknown Viruses from Netware Servers," Data Communications, vol. 21, pp. 45-46.
Sep. 21, 2011 Japanese official action in connection with counterpart Japanese patent application No. 2008-515291.
Glasswall Solutions Ltd., 2013, "What it Does" glasswallsolutions.com, available from http://web.archive/org/web/20130116065146/http://www.glasswallsolutions.com/what-it-does, dated Jan. 16, 2013, 1 page.
Glasswall Solutions Ltd., 2013, "Where it fits" glasswallsolutions.com, available from http://web.archive/org/web/20130116065202/http://www.glasswallsolutions.com/where-it-fits, dated Jan. 16, 2013, 1 page.
Inernational Search Report and Written Opinion, PCT/GB2014/052967, dated Feb. 3, 2015, 14 pages.

\* cited by examiner

ANTI-MALWARE MOBILE CONTENT DATA MANAGEMENT APPARATUS AND METHOD

RELATED APPLICATION DATA

This application claims priority under 35 U.S.C. §119 to Great Britain Patent Application No. GB1317607.8, filed Oct. 4, 2013, the disclosure of which is incorporated herein by reference.

FIELD OF THE INVENTION

This invention relates to mobile or wireless networks in general, and to anti-malware file-based content data management in mobile or wireless networks in particular.

BACKGROUND OF THE INVENTION

Malware (such as viruses, trojans and other malicious content) are becoming more and more prevalent and the traditional approaches of constructing signatures to identify these threats is becoming more and more difficult given the rate at which new variants of malware are emerging. These threats are not just constrained to Personal Computer (PC) networks, because, with the growth of 'smartphone' deployment, there has been seen an increase of malware traversing mobile or wireless networks and infecting mobile devices, e.g. handsets. A common side effect of these malware infections and the current signature based protection methods is the use of precious wireless network bandwidth either as a result of the virus infection or as a result of the daily signature update process.

SUMMARY OF THE INVENTION

The present invention provides an anti-malware mobile content data management apparatus, for use in managing content data within an input electronic file containing content data to be sent over a wireless network comprising at least one mobile device being served by the wireless network, comprising at least one tokeniser to tokenise the content data contained within the input electronic file into a tagged generic representation of the content data, a content management engine to apply a predetermined content management policy to the tagged generic representation of the content data to form content-managed tagged generic content data, and a validator to create validated content-managed content data by being arranged to ensure the content-managed content data represented in the content-managed tagged generic representation conforms to any predefined limits and rules applied to each form of content data appearing in the content data of the input electronic file, wherein an output of the validator is operably coupled to the wireless network, and arranged to provide a substitute output electronic file derived from the validated content-managed content data. Examples may use multiple instances of the tokeniser stage.

Examples may further include at least one filter to filter the tagged generic representation of the content data to remove unreferenced or unreachable content data.

Examples may further include a regenerator operably coupled to the validator and arranged to provide the substitute output electronic file derived from the validated content-managed content data by regenerating a new instance of an electronic file in a predetermined file type specification for onward use by the wireless network instead of the electronic file or by outputting the validated content managed content data as a tagged generic representation. Examples may use multiple instances of the regenerator, each located after an initial tokenisation stage, but before a next, subsequent tokenisation stage. Examples having multiple instances of both the tokenisers and regenerators may be referred to as having multiple tokeniser-regenerator pairs. A specified file type specification may be the same file type specification as the (original) electronic file sent over the wireless network, or a different file type specification suitable for carrying the regenerated content data, at least at the particular regeneration instance involved/processing stage.

Examples may further include the content management engine is further configured to normalise the substitute output electronic file to a predetermined version of the predetermined file-type specification.

In some examples, the mobile content data management apparatus may further comprise an enforcement engine operably coupled to the content management engine and arranged to provide content management policy parameters indicative of, or for use in applying, the content management policy to be in force.

In some examples, the mobile content data management apparatus may further comprise a network parameter monitor operably coupled to the enforcement engine and arranged to provide network parameters to the enforcement engine, for use in setting up or amending the content management policy parameters.

In some examples, the mobile content data management apparatus may further comprise a user interface connector operably coupled to the enforcement engine and arranged to provide content management policy parameters from at least one of: at least one mobile device being served by the wireless network, the wireless network itself, or a user of the at least one mobile device being served by the wireless network.

In some examples, the anti-malware mobile content data management apparatus may derive the content management policy parameters from location-based information provided from a location sensor within the at least one mobile device or within a wireless network entity serving the at least one mobile device. For example GPS, GLOSNASS, or wireless network triangulation device, or similar. The location-based information may be used to enable a different, alternative, communications method or link between the at least one mobile device and another sending or receiving device. This alternative communications link may be used to re-route the content data if an original wireless link is considered, for example, any of: too bandwidth restricted, too costly, and/or too insecure.

In some examples, the at least one tokeniser may comprise multiple tokenisers, each of the multiple tokenisers at different locations within the content management engine, and each arranged to re-tokenise the content data before a subsequent processing step. The subsequent processing step may include any of a regeneration step, filtering step, content management step or content validation step.

In some examples, the mobile content data management apparatus may be located at any location outside (and suitably connected to the wireless network) and/or within the wireless network, where the apparatus is able to carry out any one or more of the functions described. The described apparatus, or instances thereof, may be place or located, physically and/or logically, at an edge of the wireless network to act as an interface with another communications network to which the subject wireless network is attached for communication there between, to thereby content-manage electronic files passing through to or from the wireless network, or passing between the wireless network and the another communications network.

In some examples, the mobile content data management apparatus may be provided as a distributed mobile content data management apparatus having sub-modules arranged to carry out processing stages at different locations within the wireless network. The distributed sub-modules may be co-located with some of the other sub-modules, and/or with other entities providing the wireless network or other communications network to which the wireless network is connected for communication there between. The sub-modules may also be located within any one or more of the mobile devices served by the wireless network, or across both the wireless network and one or more of the mobile devices.

In some examples, the mobile content data management apparatus is a single instance mobile content data management apparatus, and the single instance further comprises at least a second filter to filter the tagged generic representation of the content data to remove unreferenced or unreachable content data after the content management engine has applied a predetermined content management policy to a filtered tagged generic representation of the content data.

There is also provided a mobile device comprising a mobile device-side application configured for use with the anti-malware mobile content data management apparatus described herein, wherein the mobile device-side application may comprise at least a generic reader function to allow use and/or manipulation of the content data contained within any instance of tagged generic representation of the content data, and possibly a management console portion operable to allow a user of the mobile device to setup or amend the content management policy to be applied to the same mobile device, or other mobile devices served by the wireless network.

The provided mobile device(s) according to examples of the invention may also provide one or more of the overall content management process stages, most particularly the regenerator stage (predominantly for output of files to the mobile device user), and possibly a tokenisation stage (for input of content data from the user of the mobile device, for sending out over the wireless network) In these examples, the mobile device provides complete end-end input and output content management functionality.

Examples also provide an anti-malware mobile content data management method, for use in content-managing an input electronic file containing content data to be sent over a wireless network comprising at least one mobile device being served by the wireless network, the method comprising tokenising the content data contained within the input electronic file into a tagged generic representation of the content data, content-managing the tagged generic representation of the content data to apply a predetermined content management policy to the tagged generic representation of the content data to form content-managed content data, validating the content-managed content data represented in the tagged generic representation to ensure said content-managed content data conforms to any predefined limits and rules applied to each form of content data appearing in the content data of the input electronic file, to form validated content-managed content data, and outputting a substitute output electronic file derived from the validated content-managed content data.

In some examples, the method may further comprise filtering the tagged generic representation of the content data to remove unreferenced or unreachable content data.

In some examples, the method may further comprise regenerating the content data into a substitute output electronic file derived from the validated content-managed content data by regenerating a new instance of an electronic file in a predetermined file type specification for onward use by the wireless network instead of the electronic file or by outputting the validated content managed content data as a tagged generic representation.

In some examples, the method may further comprise normalising the substitute output electronic file to a predetermined version of the predetermined file-type specification.

In some examples, the method may further comprise providing content management policy parameters indicative of, or for use in applying, the content management policy to be in force via an enforcement engine operably coupled to the content management engine.

In some examples, the method may further comprise providing network parameters to the enforcement engine via a network parameter monitor operably coupled to the enforcement engine, in order to provide means for setting up or amending the content management policy parameters.

In some examples, the method may further comprise providing content management policy parameters, via a user interface connector operably coupled to the enforcement engine, from at least one of: at least one mobile device being served by the wireless network, the wireless network itself, or a user of the at least one mobile device being served by the wireless network.

In some examples, the method may further comprise providing multiple tokenisers at different locations within the content management engine, each arranged to re-tokenise the content data before a subsequent processing step.

In some examples, the method may further comprise locating the mobile content data management apparatus within the wireless network, or at an edge of the wireless network to act as an interface with another communications network, to thereby content-manage electronic files passing through the wireless network, or between the wireless network and the another communications network.

In some examples, the method may further comprise distributing sub-modules of the mobile content data management apparatus across different locations within the wireless network, each sub-module arranged to carry out a different processing stage of an overall content management process.

In some examples, the method may further comprise a second filtering stage to filter the tagged generic representation of the content data to remove unreferenced or unreachable content data after the content management engine has applied a predetermined content management policy to a filtered tagged generic representation of the content data.

These and other aspects of the invention will be apparent from and elucidated with reference to the embodiments described hereinafter.

Example embodiments may be referred to as "anti-malware", or as providing "malware-protection", and this terminology may include any suitable protection against malware, where said malware may include, for example, viruses, trojans, and other forms of malicious content. However, the anti-malware aspect is particularly provided in examples of the invention by only regenerating known-good content data in output or intermediate electronic files, defined by certain known-good content data criteria. During operation, examples of the disclosed apparatus(es) and method(s) may operate on one or more electronic files that are received or sent by entities within a wireless network, or otherwise communicated over the wireless network, including any wired portions of said wireless network(s). Multiple wireless networks may be involved, or covered by examples of the invention.

Examples may assess every byte in an original electronic file and only regenerate one or more completely new instances of that original electronic file in the same file type specification/format as the original electronic file, and one that conforms to certain known-good criteria, in a subsequent re-writing process(es). As a result, the disclosed apparatus(es) and method(s) are able to not only provide virus protection, but also provide content data management and network bandwidth savings by allowing only appropriate (e.g. deemed allowable) file-based content data to be regenerated during the re-writing process(es). A further extension of operation may be to allow a user or network administrator to determine the appropriate (e.g. deemed-allowable) type of file-based content data that they wish to allow to traverse across the wireless network, and/or onto/out of any given user's machine(s), which may be referred to as an endpoint or mobile device (and is to be understood to include, but not be limited to, devices such as mobile handsets, desktop PCs, laptops, tablet computers, phones, 'phablets', and any other computing device that may connect to or via a wireless communications network).

In some examples, administrators and/or users may be able to control the allowable content data through a management console. The management console may be able to determine what file-based content data is allowed and which content is not (i.e. disallowed content). The management console may be located within the core wireless network, or on one or more of the mobile devices being served by the wireless network, for example within a mobile-device side application. The disclosed apparatus(es) and method(s) may also allow the administrator/user to determine what action is to be taken with any disallowed content data. Such action(s) could include whether to remove a portion or whole of the disallowed content data during a re-writing stage of the overall method, or never include the disallowed content data in any subsequent regeneration stage. The method may also allow an electronic file to continue to its intended destination or to quarantine the electronic file and to stop the electronic file travelling any further, or to allow only a functionally reduced electronic file to continue on its journey.

In example embodiments, a 'syntactic' only processing node or portion of the method may be carried out at one point in a wireless network, and this point in the wireless network may include the whole or part of discreet sub-functionality (e.g. the tokeniser, pre/post-filters, content data management and validator) described below. Syntactic only processing might occur, for example, where faster throughput of the overall wireless network, or portion thereof (including any wired portions), is required. Use of such 'syntactic' only processing may detect files, file types, and/or file-based content data within an electronic file that is/are unallowable, i.e. "offending files" (under a pre-defined policy, or otherwise, as described in more detail below) more quickly. Thus, offending (as a whole, or by portion(s) thereof only) syntactic files may be removed from the overall wireless network. Alternatively, or additionally, offending files may be passed to a further node, or method sub-routine, for further analysis. The 'syntactic' only processing node or portion may be an initial stage, before the other processing nodes or portions are instigated, to remove the offending file or content data at the earliest opportunity.

'Syntactic' only processing nodes or portions may use a 'basic rules' processor to detect and weed out files, or file-based content data thereof, which are clearly not formed correctly syntactically (i.e. the syntactic processing is concerned with ensuring that the basic elements of the file and/or file-based content data structure are correct). This is a particularly beneficial stage of processing files according to examples of the invention, because statistical analysis of real life network data has shown that over 90% of all malware-based attacks may be of this "syntactic-offending" type—i.e. based upon syntactically incorrect file content data. Moreover, removing files that fail a syntactic review may maintain a very high data flow though the wireless network (or at least a higher data rate than would otherwise be the case), since disallowed content data may be removed and/or ignored earlier, and hence prevent waste of subsequent networking resources (including bandwidth and processing overhead, amongst other things). For example, any subsequent decompression.

Examples may provide a plurality of processing (sub-) stages, where each (sub-) stage may be configured to carry out a different check. Moreover, by carrying out basic checks first, examples of the invention may distribute the processing load across multiple entities within the wireless network, for example, the (quick) basic checks may be performed at one (or multiple, earlier) node(s), with any further, more in-depth, checks performed elsewhere, subsequently (e.g. closer to the user). Effectively, this allows malicious or unwanted files, or portions thereof, —i.e. the disallowed content data—to be stopped earlier on in the wireless network and therefore not take up bandwidth and processing cycles at a later stage.

PDF (Portable Document Format, usually abbreviated to .pdf as the file extension indicating its type) is but one example file type out of many (e.g. Word .doc(x), Excel .xls(x), PowerPoint .ppt(x), .rtf, .html, .tif, .jpg, .gif, etc) of the sort of file type to which examples of the invention may be applied. In the PDF example, the electronic file is constructed out of nodes that are connected by a tree structure. It is quite often the case that these branches are broken when the files are saved by certain badly implemented 'reader' applications. For example, instead of correctly rewriting the whole file out, these badly implemented 'reader' applications break the links within the respective electronic file, that are needed by the approved parsing used for said type of electronic file, thus rendering the content data unreachable and 'hidden'. Moreover, this means that the electronic file size grows even though the content data that causes the increased size is unwanted. In examples of the invention, a Pre-Filter stage may be used to remove this superfluous, un-reference-able/unreachable content data, and hence save bandwidth needed to transmit an electronic file over the wireless communications network and the like. In the following, the term 'file format' may be synonymous with "file type", depending on use. Similarly, 'wireless network' and 'wireless communications network' may be used interchangeable, unless otherwise stated.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
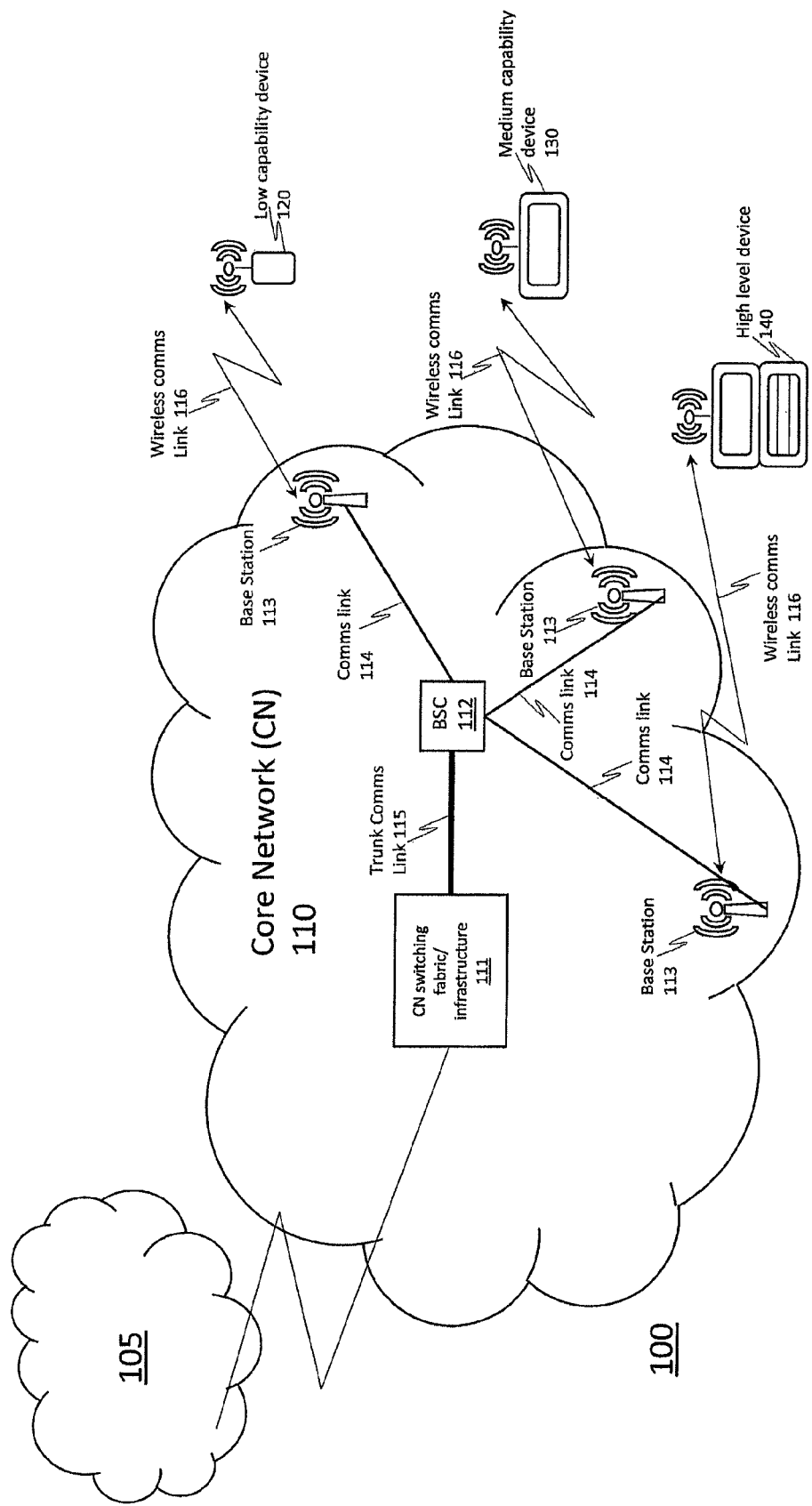
FIG. 1 shows a schematic of an example mobile network with a plurality of mobile devices.

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Examples of the present invention may provide transcoding of one content data type to another, carried out based on predefined management policy. This predefined management policy may be controlled by a user or (the system) administrator through, for example, an administration console, or perhaps an authorised security representative of the organisation making use of one or more wireless networks according to examples of the invention. The control may take the form of an app on a mobile device, allowing the respective user or (the system) administrator to control a level of deemed allowable content data. The control of a level of deemed allowable content data may therefore, for example, control a level of compression in use on the wireless network, or portion thereof, at a given time. The control may also take the form of direct control over actual or assumed bandwidth, specific allowable/disallowable file types, data content types, and the like, and these may be enforced by an enforcement engine.

Furthermore, in some examples, an automated control mechanism may be additionally or alternatively provided. The automated control mechanism may be controlled by the wireless network in which examples of the invention may be implemented/situated. The automated control mechanism may dynamically adjust the content data management policy(s) depending on different factors, for example the environmental or commercial factors that may affect a data channel between a mobile device and the wireless network on which the mobile device operates. So, for example, an environmental factor may be that the data channel is experiencing low bandwidth due to interference. In this sort of situation, the deemed allowable content data, and hence content data of an electronic file may be automatically adjusted, for example by a more aggressive content data management policy, to reduce the data bandwidth requirements to send or receive an electronic file over the wireless network (e.g. images may be removed from documents, leaving just text). Other environmental factors may also be used to control the content data received by and sent to a mobile device over a wireless communications link, in the form of an electronic file. The content data may also be contained in alternative constructs other than "files", and the term 'file' or 'files' through-out this description may be construed to include any such alternative data container.

Another, more commercial factor example may be that the mobile device is roaming over a different wireless network, so that data charges are higher than on the home wireless network. In such a case, the data bandwidth may again be limited, in order to reduce roaming data charges. Detection of a roaming state may be carried out logically—using connectivity data available to the wireless network or mobile device, or may be carried out using positioning information, i.e. directly measured location-based information, for example from GPS readings derived from a GPS sensor/receiver, or other type of location sensor within the one or more mobile devices. Therefore, location-based information may be particularly useful to determine cost of data, which can then feedback to determine a suitable level of content data management policy in use. The determination of a suitable level of content data management may be static or dynamic.

The location-based information may be derived from positioning sensors, such as GPS, GLOSNASS and/or Galileo satellite positioning sensors, or may be derived by other suitable means, such as inertial sensors, or wireless triangulation means (e.g. using multiple terrestrial wireless network signals with triangulation techniques to thereby provide a triangulated position). The location-based information may also be deduced by the network appliance/mobile device, as the network appliance/mobile device may know the form of routing to the appropriate base-station with which the mobile device (e.g. handset) is communicating—i.e. a more logical location assessment.

In some examples, the location-based information may indicate the mobile device is in an area where the use of the normal wireless network by the mobile device (for either some, or all content data) is deemed undesirable or not allowable by the content management policy in force. This might happen, for example, due to only restricted bandwidth being available to the mobile device over the wireless network (or portion thereof) serving the mobile device at that time, or the wireless network is deemed unsafe for passage of the content data to be sent/received (e.g. because the mobile device is roaming on another wireless network at the time). Low/restricted bandwidth may only be available to the mobile device if, for example, the respective mobile device is at an edge of wireless network's reception area, which may mean it is only provided with 2G type connectivity, whereas the core of the wireless network has a 3G type connectivity. However, the restricted bandwidth may also be due to other factors, including the fact that the mobile device is currently roaming onto another wireless network, so the restricted bandwidth is caused by monetary or security considerations, rather than actual service provision issues, per se.

Regardless of why the bandwidth is deemed too restricted/restrictive or otherwise unsafe or unsuitable for the respective mobile device's use (by the content management policy in force), the respective mobile device, or content management application/module thereon, may reroute the communications from/to the respective mobile device over an alternative communications channel instead. This may be particularly beneficial where the respective mobile device may be provided with, for example, a higher speed (yet lower latency) satellite communications transceiver system as well as the terrestrial wireless communications transceiver system. For example, for use with the Iridium, GlobalStar, INMARSAT satellite system or any other high/medium/low earth orbit global satellite communications system, or any satellite system that can provide global coverage with high data rate capacity. In these examples, the satellite communications system may provide high speed wireless communications from the respective mobile device to the satellite (e.g. 10's of Mbit to 100's of Mbit, or even multi-Gbit links), operable while the satellite is within a line of sight (e.g. above the horizon/ground clutter of) the mobile device's current location. The satellite may have significant local data storage means (i.e. in the satellite) to hold this information until such time as the satellite has orbited to another, safe, e.g. home, location (usually back on the main/"normal" wireless network, for onward transmission thereon). The satellite may then send the stored content data back down to a receiver station in the home wireless network. This may be referred to as a 'store-and-forward' capability This would be particularly useful where the content data set to be sent is any of: very large (e.g. multi-gigabytes, or more)—which might happen when doing significant data collection in a remote location (e.g. seismological surveys), or very sensitive (e.g. a commercial business plan made on site at a customer's site location abroad). By using such alternative communications links, the content data may be maintained at an otherwise higher data set size, or higher security of transmission (i.e. without snooping, etc) than may otherwise be the case.

The content data management policies, controlled and/or set up by, for example, suitable content management policy parameters used within the system, may also be determined based on actual mobile device/endpoint capabilities, where, for example the mobile device/endpoint capabilities may be ascertained by the screen size of the endpoint in question, and/or the processing resources available (e.g. CPU speed, number, bit-depth, associated cache and/or RAM size, RAM speed, availability of co-processors or cores in a multi-core device, etc). The level of processing resources available in any given mobile device/endpoint that may connect and make use of examples of the invention may determine a given level of capability of the respective mobile device. For example, determining whether a mobile device/endpoint is deemed a "low capability device", "medium capability device"; and/or "high capability device". The capability levels used may also be (re-) adjusted over time, as capabilities move on, and newer mobile device technologies supersede existing technologies.

The mobile devices may be suitably partitioned in to groups of similar or identical mobile devices according to their capabilities. For example, the proposed apparatus(es), methods and systems may be arranged to place any mobile device/endpoint connecting to the wireless communications network in which embodiments of the invention are instantiated, into three broad categories of device: "Low capability device", e.g. typical of small handsets that can open image documents, as well as have some limited browsing capability; "Medium capability device", e.g. smartphones, and typical of devices that are able to open documents such as Microsoft Word, Excel, PDF, albeit with limited capability, but have a much richer web browsing experience; "High capability device", e.g. Tablet, PC, laptop, —i.e. the typical characterisation of devices that are able to offer a full document parsing capability as well as a complete web browsing experience, and the like.

With these mobile-device-capability categorisations in mind, examples of the invention may have a file regeneration policy (i.e. policy for the re-writing of new instance(s) of the same file type as the original input electronic file) set to mirror the capability of the mobile device/endpoint that is intended to receive the content data/electronic file in question. In some examples, there may be multiple output file types regenerated from a single input electronic file, so that each of many device categories can be provided for, whilst minimising wireless network resources needed to deliver each version to the respective mobile devices, This may be extended, so that, for example, the content data can be automatically updated as the mobile device changes for a given user. For example, a user may upgrade a mobile device, and automatically have the updated version of the electronic file provided on next review of that file, at a later date. Or the same mobile device might receive an original content data managed electronic file whilst away, roaming on another country's wireless network, but on return to the UK, the original full(er) file is provided automatically on next review. Other examples include: if a small handset, i.e. "low capability device" is destined to receive an electronic file through the described anti-malware content data management system, then there is little point in the described apparatuses, methods or system regenerating content data that the 'Low' capability mobile device/end point cannot display, and examples of the invention may be suitably arranged to not regenerate any content data that the target mobile device cannot display or use, thus preserving network bandwidth wastage transferring (as yet) un-useable data. This is to say, the level of content data regeneration may be ascertained based on, amongst other things, the determined or predefined capability categorisation and that may be varied, and the variance reacted upon by the overall wireless network, dynamically (i.e. "on the fly").

Examples of the invention may also assist with maintaining cross domain segregation by using file transformation. This is because mobile devices/endpoints and wireless network infrastructure according to example embodiments of the invention may segregate the users' business data from their personal data by effectively ring fencing the two domains. For example, where a document needs to travel from a domain of 'high trust' to a domain of 'lower trust', an embodiment of the invention is able to provide this true cross domain capability by performing the transformation function on the data whether that is at the endpoint or distributed across said wireless network. This is to say, the file format content data is transformed from its original form to an intermediate, generalised, form, and then onwardly regenerated to a final form. Therefore nothing that is unknown or unaccounted for can pass through this isolation barrier, because, effectively, it has been removed from a domain (or file type format) where attacks are possible, to an inert domain (or file type free form) where no attack can be launched.

As mentioned above, example embodiments of the invention may transform content data from an original form into an intermediate, generalised, form or an internal representation of the content data. This transformation may include applying selective content data management of the content data, then regenerating a new substitute file (i.e. a new file instance, built up from scratch and consisting of only known-good content data from the original electronic file).

The regenerated substitute file may be in a generic form. This generic form may be considered an effective 'air-gap' security barrier, and may provide total isolation from the untrusted input electronic file to the regenerated, sanitised output electronic file (either output in generic form itself, or onwardly processed as a new instance of a file in the same file type as the original input file). As further discussed, the described anti-malware content data management apparatus(es) and method(s) may be performed on a single entity within the wireless network, using a single or multi-pass process, or on a number of distributed entities each performing a different, individual pass, as will be described in more detail below. The air-gap may be provided by use of different memory buffers, logically and perhaps physically separated, and with a tokenisation and regeneration process pair utilised between the memory buffers, so that the content data is effectively filtered and/or content managed and hence only known-good content data may be moved between the two memory buffers, as will be explained in more detail below.

Examples of the present invention may also provide an apparatus or method of managing content data in a mobile device, or over mobile/wireless network, that may be applied to an electronic file containing content data received from an external network, and carried over the wireless network in which an example of the invention is embodied. The method may comprise any one or more of: transforming a received (or to be sent) electronic file in to a generic representation; applying remediation to the generic representation; applying content data management to the remediated generic representation for the purposes of threat and/or bandwidth reduction and/or other content data restriction policy; validation of said generic representation; and regeneration of the content data as a new instance of a file or generic representation.

The herein described anti-malware mobile content data management approach provides the benefit of allowing content data within a multitude of file formats to be validated and subject to content data management policy using a single or multi-pass defined process, the process being defined in a common format (i.e. using a generic representation or representations), thus removing the requirement for a multitude of different validation routines for each file format(s) that is to be supported by the anti-malware mobile content data management apparatus(es) and method(s). When dealing with multiple file types, an improvement is to have a number of file tokenisers, described later, which convert data from an original input file form to that of the tagged generic representation by assigning one or more tag(s) to represent the content data, where the tagged generic content data is derived from the original content data. This approach reduces complexity of design, because it allows, for example, a singular validation routine for all generic tagged representations that may be used on all different input/output file formats (i.e. re-useable across all file formats), rather than requiring the construction of individual validation routines for each of the file formats that are to be supported.

Moreover, by transforming the incoming content data from an electronic file to a generic representation it also removes the necessity for a receiving mobile device/endpoint to have a number of software applications to parse the multitude of file formats that are to be supported for viewing and/or manipulation on the mobile devices. Effectively, the electronic file content data is represented in a form that can be rendered by a single mobile-based application, no matter what the originating file format was.

There now follows a more detailed explanation of examples of the invention, with reference to the figures.

FIG. 1 shows a schematic of an example existing mobile wireless communications network 100 with a plurality of mobile devices 120, 130, 140, connected thereto. In this figure there is shown a core network (CN) 110, comprising, for example, a core network switching fabric 111 coupled to one or more base station controllers 112 (a singular base station controller is shown, for simplicity). A base station controller (BSC) 112 may be operatively coupled to one or more base stations 113, via one or more communication links 114. There may be multiple base station controllers (not shown), each controlling a number of base-stations 113, as a sub-set of the overall wireless network 100. The one or more base stations 113 may communicate with the plurality of mobile devices 120-140 using any wireless communication standard, currently in use, or yet to be deployed such as for example, but not limited to: GSM, GPRS, 3G, UTMS, W-CDMA, WiMAX, LTE, LTE-advanced, etc. Depending on the communication standard in use in the wireless network described below (i.e. items 100-103), the base station controllers, CN switching fabric 111, and base stations as referenced below may be called other things (i.e. variants), but act in a functionally similar way. The functionality may also be split across the different entities in a different way, but act together in the same way, and therefore the below should be construed to include all such variants.

The communications links 114 used to connect the base-stations 113 to the base station controller(s) 112, may be wired (e.g. Ethernet/optical IP links) or wireless links (e.g. microwave link, etc), or any other functionally similar communications links. The communications links 114 may be in any suitable topology (a hub and spoke topology is shown, but may also be in a ring formation or comprise multiple links between different base-stations 113 as well as the base station controller 112). The core network 110 is typically connected to the internet 105 at large, to interconnect wireless devices 120-140 served by the wireless network 100, to the internet 105. The core network 110 may comprise the core network switching fabric 111, which may be used for routing data, such as voice, electronic files, text messages, etc, to an appropriate recipient mobile device in the wireless network 100 at large. Put another way, the core network switching fabric 111 may be considered the main infrastructure that provides the call and messaging routing capability, providing the interface between the external internet 105 and the base station controller 112 which performs the administration and control of the individual base stations 113 which connect wirelessly to the each of the said mobile device endpoints 120, 130 and 140, via wireless communications links 116.

This core network switching fabric 111 may comprise a plurality of network core switches, routers or the like (not shown individually) connected to each other by suitable bi-directional interlinks, where, for example, each switch or router serves a portion of the overall wireless network 100, e.g. an individual base station controller (BSC) 112. The core switches may be connected together using trunk/main communications links 115. These trunk communications links 115 may be a multiple of, or orders of magnitude greater capacity than, the individual links 114 connecting the BSC 112 to a base station 113, as shown.

The wireless network 100 may be connected to, and hence serve, one or more mobile devices/endpoint 120-140. In FIG. 1, there are shown examples of three broad groups of devices: a "low capability device" 120, for example, an earlier generation handset (also may be called a dumbphone)

that is able to send text messages, make calls and make use of a very limited set of media such as greyscale-only images, and the like; a "medium capability device" device 130, e.g. a feature phone (such as, for example, a Blackberry) or other Smartphone device, such as, e.g. an iphone, etc, and capable of opening a greater range of files and file portion content data, etc; and/or a "high capability device" 140, such as, for example, a tablet, laptop or other device with substantial processing resources available thereto.

Figure 2:
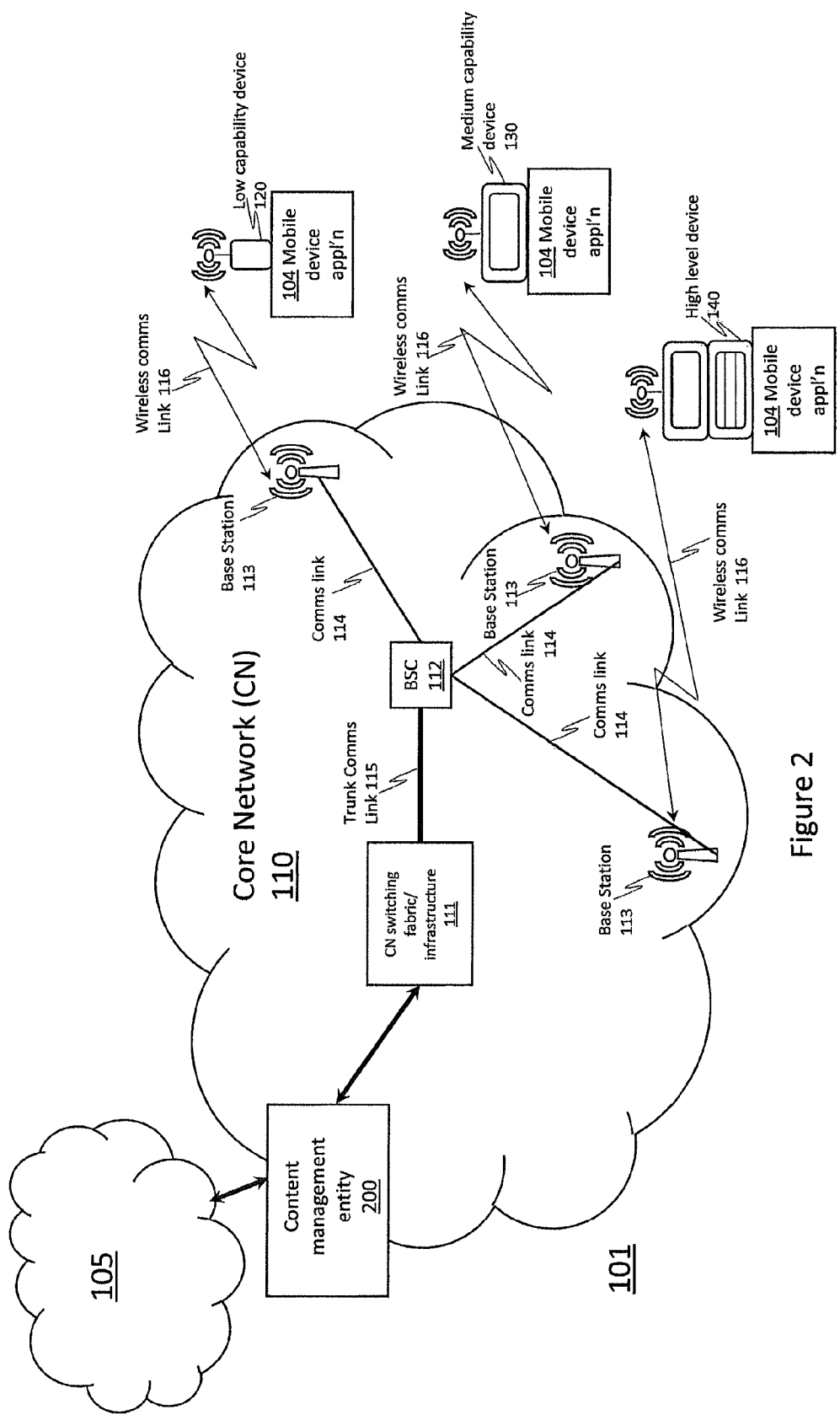
FIG. 2 shows a schematic of an example mobile network with a plurality of mobile devices according to a first example embodiment of the present invention.

FIG. 2 shows a schematic of an example updated mobile/wireless network 101 with a plurality of mobile devices according to a first example embodiment of the present invention. The majority of the mobile/wireless communications network 101 is the same as that for FIG. 1, and where the items are the same, the reference numerals used are the same as well. However, this mobile/wireless network 101 also further includes a content management entity 200 according to an example embodiment of the invention. This content management entity 200 may be located on an edge of the core-network 110 as shown, between the core network 110 and the internet 105 at large. The mobile devices 120-140 now also further comprise a mobile device application 104, which provides the mobile device side functionality of examples of the invention. A mobile-device in FIG. 2 (i.e. any of 120, 130 and 140) may be a device meaning to have a screen, keyboard of differing capability, a processor and associated memory to perform tasks such as receiving and making voice calls as well as sending and receiving text based messages or email messages, or any other electronic files. Furthermore, these mobile devices may also have software-based applications that perform a variety of tasks including user defined software applications or 'apps'. In some examples, an 'app' 104 could perform the function of the content management entity 200 (or the tokeniser 201, or any other sub-module of the content management entity described later). As the mobile device 120, 130 or 140 is effectively performing mobile device side functionality of examples of the invention, this may then take the onus of performing the described functionality away from the wireless network and associated infrastructure. By positioning the content management entity 200 (or sub-module or part thereof, such as tokeniser 201, etc) as a mobile application 104 or 'app' 104 on the mobile device, then the malware protection and content data management can be realised where data traffic is being transmitted from the mobile device as opposed to just being received by the mobile device entering the core network 110 from the internet 105. In the distributed embodiment, detailed in FIG. 3, this mobile 'app' 104 element may only need to carry out the functionality described as the tokeniser 201, so that the mobile handset performs the conversion to the generic tagged format in readiness for further processing by other entities in the wireless network as described.

The placement of the content management entity 200 at the edge of the wireless network 101, as shown, is an optimal bandwidth saving positioning of the said content management entity 200, because it maximises the bandwidth savings across the wireless network 101 as a whole. This is because the content management functionality is realised, at content management entity 200, before the file content data enters the wireless network 101 from the internet 105. However, the content management entity 200 may also be located at other places within the wireless network 101 to provide other optimisations where, for example, data and/or connectivity resilience and load balancing are as important as outright bandwidth reduction. The way in which the content management entity(s) 200 according to examples of the invention operate(s) will be described in more detail below. Some examples may also use multiple content management entities 200, for example located both at every internet/core network interface, and potentially every core network/mobile device interface. The latter may be a shared interface servicing multiple mobile devices (e.g. at a base station 113).

Figure 3:
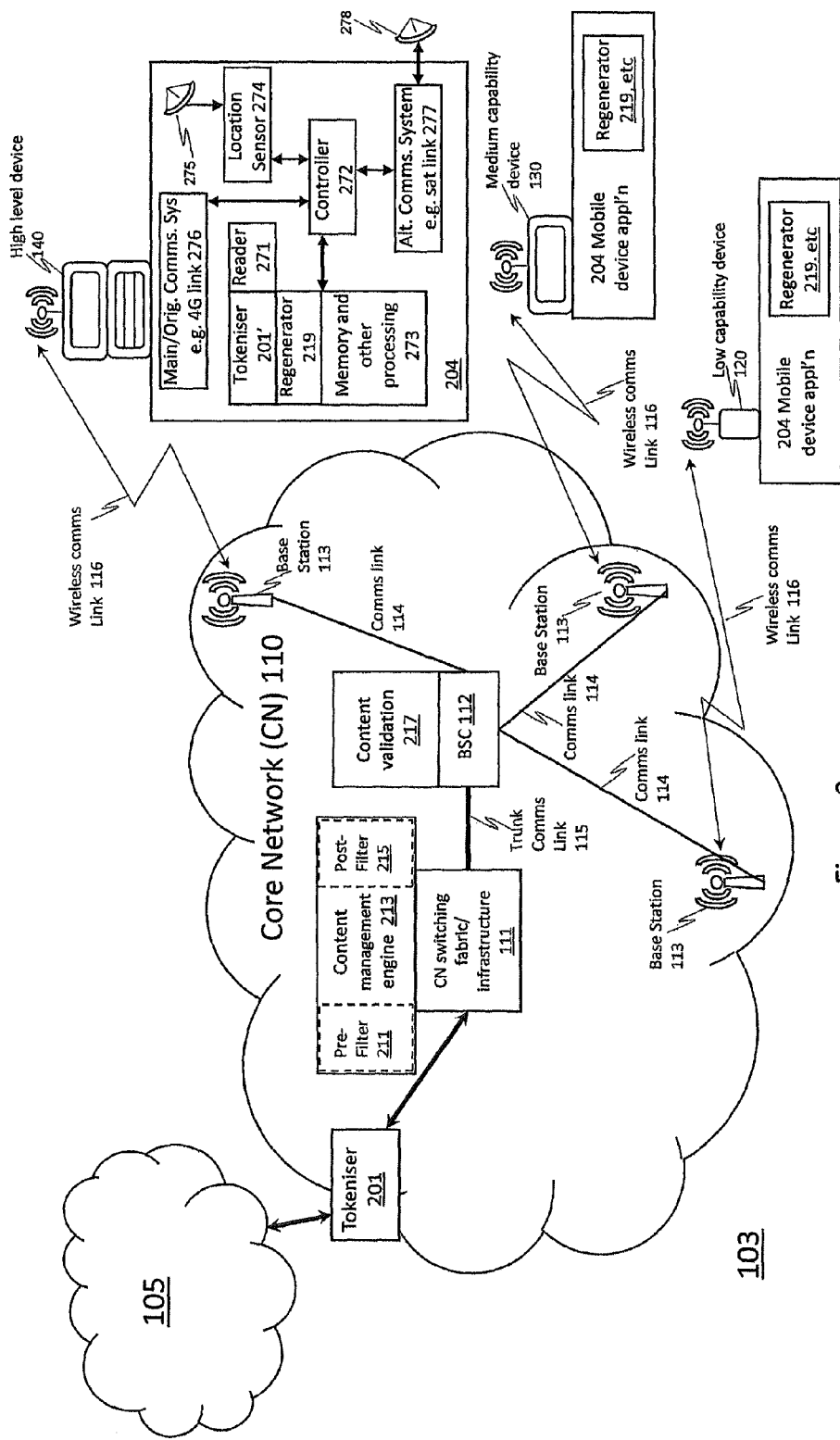
FIG. 3 shows a schematic of an example mobile network with a plurality of mobile devices according to a second example embodiment of the present invention.

FIG. 3 shows a schematic of an example wireless network 103 with a plurality of mobile devices 120-140 according to a second distributed example embodiment of the present invention. It will be appreciated that the specific distribution level or topology used in any given example instance of a wireless network according to the invention may vary, and may be dependent on the specific requirements of the particular instance of a wireless network in use. Again, the majority of the mobile/wireless network 103 is the same as that for FIG. 1, and where the items are the same, the reference numerals used are the same as well. However, this example mobile/wireless network 103 differs from that of FIG. 2, in that the content management entity 200 is replaced by a distributed version, comprising distributed portions (i.e. sub-parts, sub-processes or sub-modules), for example, a core network instance tokeniser 201 (shown as the 'front end'—i.e. data entry point—of the distributed content management entity in to the core network 110) in this example located at the "edge of network" position of the original single instance version of the content management entity 200, a pre-filter 211, a content management engine 213, a post-filter 215 (in this example, these three sub-modules are shown as co-located with the CN switching fabric 111), a content validator 217 (co-located with the BSC 112) and a distributed mobile device application or module 204 (which may be contained within each of the mobile devices 120-140 connected to the wireless communications network 103) that may include a number of sub-module/processes itself, including regenerator 219 sub-module, and the like. The distributed mobile device application or module 204 may be the same as, similar to, or different from the single instance mobile device application 104 (of FIG. 2), depending on the extent and/or specific arrangement of the distribution of the content management process (e.g. location of tokeniser—in mobile device, or not). This is to say, distributed mobile device application or module 204 may provide some of the distributed processing of the content data, as well as the viewing functionality. In this figure, there is shown a single more detailed example of the mobile device application or module 204, in this case, with respect to the high level mobile device 140, however this is only exemplary, and the mobile device application or module 204 used within medium or low capability devices 120/130 may also take the same, or similar form (i.e. include one or more of the below described sub-modules).

The exemplary more detailed mobile device application or module 204 comprises a number of sub-modules, including a regenerator 219, similar in function to the regenerator described elsewhere. There is also shown a mobile device instance tokeniser sub-module 201' that operates in a similar way as the tokeniser described elsewhere in this document. There may also be an adjunct reader sub-module 271 that may be a generic tagged representation reader function. The mobile device application or module 204 may also comprise a controller sub-module 272 including, for example, a processor to provide the mobile device processing resources, in combination with memory and other processing functionality sub-module(s) 273, which together may provide the reader sub-module 271, tokeniser sub-module 201' and regenerator sub-module 219 functions. The input(s) and output(s) from/to the mobile device application or module 204 as a whole may be displayed on display (not shown in figure for clarity), under control by user, through user input device (also not shown in figure for clarity). The controller sub-module 272 is communicatively coupled to a main/original wireless communications system link sub-module 276 (e.g. a 3G/4G transceiver system sub-module) to provide the "normal" wireless communications link 116 to the wireless network 103, via base station 113. However, the mobile device application or module 204 may also provide a location sensor 274 (e.g. GPS, etc—which may utilise a receive-only satellite antenna 275. The receive-only antenna may be internal as shown, or external, to the mobile device), coupled to the controller 272, to provide location-based information that may also be used to determine content management policy (e.g. control) parameters. These location-based information derived content management policy parameters, in certain situations, such as where they determine the wireless network 103 to be insufficient or too slow for the mobile device's current communicators needs, or simply too insecure, may then invoke use of an alternative communications link system sub-module, for example an independent, high speed satellite transceiver system 277, operating through, e.g. a bi-directional satellite antenna 278 (typically external, as shown, but may be internal as well), which may provide the required speed and/or security of communications to the mobile device in the current location of the mobile device, when necessary for the current content data being handled by the mobile-device. If the respective content data is to be received by the mobile device, a forewarning, e.g. notification flag, or similar may be sent to the mobile device over the normal wireless link 116, to enable powering up of the alternative communications system sub-module 277 ready for receipt of any content data that requires that alternative communications route to be used.

The operation(s) of, an inter-operation between, the distributed portions of the overall content management system, especially of the core-network, will be described in more detail below. In examples, the distributed content management entity may be distributed across the whole of the core network 110, wireless "edge" (i.e. outside the core) network (e.g. base stations, their controller (BSCs) and other BSC-coupled entities, and the like) and even the mobile-devices connected thereto. In any case, the (or at least a first instance of the) tokeniser may still remain at the core network edge (e.g. the position of the tokeniser 201 in FIG. 3). The tokeniser 201 may transform the electronic file into a generic representation whilst also performing some basic syntactical checks on the content data, so that bandwidth may be saved at an entry point into the core network 110. Moreover, this arrangement may also allow the content data to enter the core network 110 in a generic form, which is unable to cause any malicious activity since it has already be transformed into an inert generic form.

The tokeniser 201, pre-filter 211, content management engine 213, post-filter 215, content validation 217 and distributed mobile device application 204 (including regenerator 219, and other sub-modules, where appropriate) entities may be provided as add-on modules of the existing entities within the wireless network 103, for example being in the form of add-on modules for the BSC 112, core network switching fabric 111, and mobile devices 120-140 (as shown), and/or may be separate entities suitably inter-linked with said existing wireless network entities (where a 'wireless network entity' is any item used to provide, or used with, the wireless network—i.e. wireless network entities 111-140, in the examples shown herein).

Figure 4:
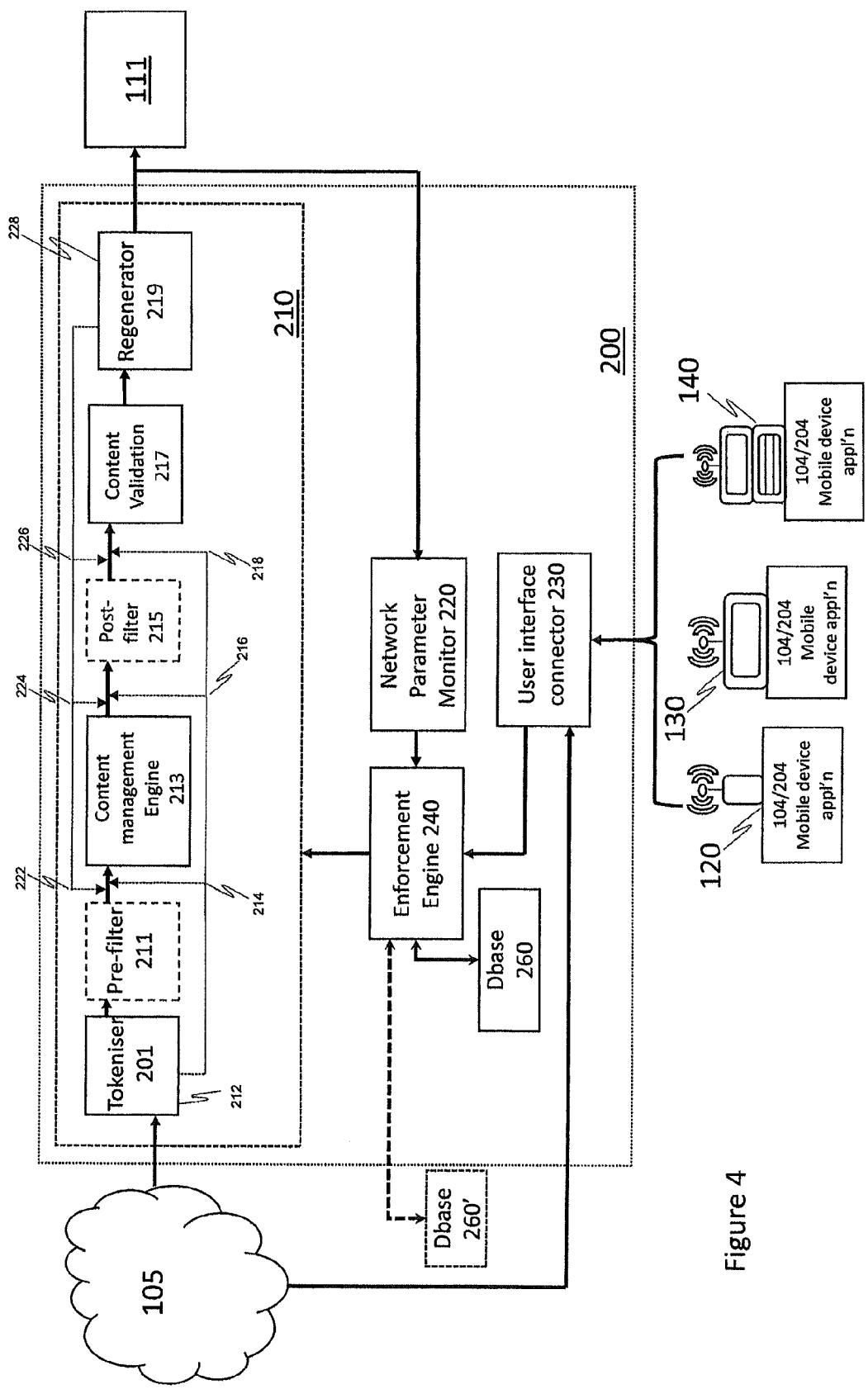
FIG. 4 shows an example of a single instance network appliance according to a first example embodiment of the present invention.

FIG. 4 shows an example of a single instance content management entity 200 according to a first example embodiment of the present invention. The content management entity 200 may be operably coupled between the internet 105 and core network switching fabric 111 (as shown, however other placements may be used as well). The plurality of mobile devices 120-140 may also be operatively coupled to the content management entity 200.

The content management entity 200 may comprise a number of sub-modules that interact, under control and/or set-up by content management policy parameters, to carry out the below described methods (e.g. as described in FIG. 7).

The sub-modules may comprise, for example, a set of content management processes (and associated sub-modules) 210 that are placed on a main workflow through the content management system between the internet 105 and the CN switching fabric 111. The disclosed workflow, or any variants thereof, may be located between other, different, networked items, or networks. The content management processes 210 may comprise a tokeniser module 201, a pre-filter module 211, a content management module 213, a post filter module 215, a validator module 217 and a regenerator module 219. The pre-filter 211 and post-filter 215 are optional, hence shown in dotted line in the figures. The tokeniser module 201 may be operatively coupled at the initial position 212 (i.e. the front end/entry point of the content data into the content management processes 210), but the same (where the tokeniser is "multi-stream"—i.e. able to process multiple different data flows at the same time) or different (where a single tokeniser is used per data stream) tokenisers 201 may also be located at other subsequent positions in the workflow. This is shown in the figure as the dotted lines located after each subsequent sub-module, i.e. at positions 214 to 218, starting after the pre-filter 211 and ending after the post-filter 215. As discussed above, the initial tokeniser 201 may be placed on the edge of the core network 110, i.e. effectively at the front end of the overall content management system, especially in a distributed example realisation of the invention (e.g. as per FIG. 3—item 201). For each instance of a tokeniser, there is generally provided an instance of the regenerator 219. In the single instance example shown in FIG. 4, with only a single instance of both the tokeniser 201 and regenerator 219, the regenerator 219 is positioned at the very end, i.e. at position 228. The specific form shown in FIG. 4 solid line (i.e. a single tokeniser at the front end, and a single regenerator at the back end) may be particularly the case if the overall content management system is realised on one device/entity (for example when each sub-module process may be using a single shared memory).

However, where there are multiple regenerators used, each regenerator is to operate before the next instance of a tokeniser (so the regenerator can move the processed content data from the tokenised, generic tagged domain, back into the "normal" domain—usually in the same file type specification as the original input electronic file). This specific ordering of the subsequent tokeniser and regenerator instances is shown by the arrows to positions 222, 224 and 226 being before the arrows to position 214, 216 and 218. Where multiple instances of the tokeniser/regenerator are used, this provides a re-tokenisation effect between each sub-process.

This re-tokenisation has the benefit, in any implementation using a shared memory architecture, of ensuring that no stale content data exists in the tagged generic representation, and hence allowed to propagate between passes to the subsequent sub-module, because each pass starts with 'fresh' tokenised content data transformed from the original input electronic file. Whereas, in a distributed embodiment (as per FIG. 3), a single tokeniser at point 212 may be all that is required, as there can be no chance of stale data being maintained as each process is performed using a different hardware (with different memory). Moreover, with a distributed architecture, there may be a regeneration stage between each of the aforementioned processes—and this regeneration stage can potentially output the tagged generic representation of the content data in to a file format equivalent to or the same as the original input electronic file (remembering that we can we can either output a file identical in format as the input electronic file (e.g. pdf in, pdf out), or a different form of file that can contain the same sort of content data—e.g. pdf in rtf out). Put another way, the memory storage involved in the processing is different.

The content management entity 200 may further comprise an enforcement engine 240 which ensures a selected content management policy in force is correctly applied to the electronic file passing between, for example, the internet 105 and core network 110. The enforcement engine may do this by controlling the operation of each of the process (sub-) modules within overall content management processes 210, i.e., in the example shown, the pre-filter module 211, content management module 213, post filter module 215, validator module 217, and regenerator module 219.

For example, content management processes 210 may carry out a transformation of input data (e.g. an electronic file from the internet 105) to a generic representation of that input electronic file, via a content regeneration process described in more detail below, which also may include pre- and post-filtering and a validation of said content data in a tokenised generic representation. A determination of what content data should be regenerated may be based on decision making carried out by the (content management policy) enforcement engine 240. This is to say, the enforcement engine may be arranged to provide content management policy parameters indicative of, or for use in applying, the content management policy that is in force (i.e. being used currently).

The content management entity 200 may further comprise a network parameter monitor 220 operatively coupled to the enforcement engine 240, to thereby provide data parameters, such as wireless network performance data or parameters, for correct operation of the enforcement engine 240. These performance parameters may be, or include, operational or network parameters derived from the core network 110 and/or mobile devices 120-140.

The parameters used/provided by the network parameter monitor 220 may be derived from the core network 110, from, for example, the CN switching fabric 111 (e.g. in headers on the data packets provided by the hardware, such as routers and switches forming said CN switching fabric 111), or they may be derived from a module or application operating within the mobile devices 120-140 connected to the wireless network 103. In this latter case, the network parameters may be provided to the network parameter monitor 220 by the mobile devices 120-140 via a user interface connector 230. This user interface connector 230 may itself be connected via another module, such as the enforcement engine 240 (as shown), or via a direct interface between the user interface connector 230 and network parameter monitor 220, not shown). The data to control the content management processes 210 carried out by any of the modules within the content management entity 200 shown in FIG. 4 may be stored in a database 260, which may be operatively coupled to all the modules either directly, or indirectly (e.g. via a programmatic interface in the enforcement engine 240 in the example shown—i.e. no direct links to each module is shown in this figure, for clarity). The database 260 may reside within the single instance content management entity 200, as shown in solid line, or may be located outside the single instance content management entity 200, as shown by database 260', dotted outline. This latter external database 260' configuration may be particularly used with a distributed instance, with separate modules 201-204 (as shown in FIG. 3).

The policy enforcement engine 240 may base its decision making on stored policy settings which could be stored in the database (260 or 260'), such as an SQL type database or any form of persistent storage mechanism. The stored policies may be determined by data inputs from the network parameter engine 220, and/or the user interface connector 230. The network parameter engine 240 may monitor the performance of any relevant communications link(s) (e.g. communications links 114/115, or the wireless communications links 116 between each mobile device 120-140 and the core network 110, in FIGS. 1-3) in real time, and may adjust the policy enforcement engine's 240 policy settings depending on the quality/performance/etc of said communications links 114-116.

For example, if a particular communications link 114-116 is of a consistently poor quality, for example determined by measuring the communications link bit rate or signal to noise ratio over a given time period (and potentially further performing a rolling average), then the amount of content data that can be handled by that communication link(s) 114-116 may be determined to be lower. Therefore, for example, the determined policy related to the mobile device(s) attached via that lower performing communications link 114-116 may be restricted (or restricted further) so that less content data is carried over the respective poorly performing communications link (whilst the performance is reduced), and therefore maximising useful bandwidth. This approach improves overall network performance, and may improve end user experience. For example, the electronic file content data allowed to be sent over the link may be restricted from including both text and images to only include text, or reducing from including video and audio, to just audio, etc. When the respective poorly performing communications link returns to higher performance, the restriction (or further restriction) may be removed/reduced, as appropriate.

The content data management policy applied by the enforcement engine 240 may comprise more than one aspect—for example, it may comprise an automated aspect based real time feedback, and a manual aspect based upon, for example, predefined hard/set limitations. Thus, the policy is fully adjustable to take into account any usage scenarios, both short and long term.

The automated policy aspect (e.g. automatic/feedback derived enforcement engine settings) may be arranged to take priority over the manual user settings (as a whole or at a more granular level), or vice versa.

The manual policy aspect (e.g. manual enforcement engine settings) may be provided through the user interface 230 from the user devices themselves, through mobile application or module 104 or 204, as shown, or through the internet 105. They may also be, at least partially, hard coded in to the overall system, so the user interface is more of a selection process, rather than a complex definition process.

This latter arrangement allows relatively complex policies to be realised with minimum user input/experience or even bandwidth.

An administrator or general user may be allowed to set the enforcement engine 240 content data management policies based on the capability of any given mobile device in use on the wireless network 103, or based upon a risk posture (i.e. a corporate's definition of a level of risk they are willing to accept with their mobile communications infrastructure—e.g. they may decide to never allow a Word document with macros). The risk posture may be variable over time and location of device, and may be tightly related to their organisation's security policies or indeed their own individual user preferences. The user interface connector 230 could be realised as a core network-side software application that connects with the dedicated mobile-side applications or module (104 or 204), or a dedicated hardware module residing within the respective mobile device 120-140. Alternatively, or in addition, the overall system may provide an integrated user interface, such as a web based interface, that can be accessed through any standard web browser (i.e. through the internet 105 at large).

Figure 5:
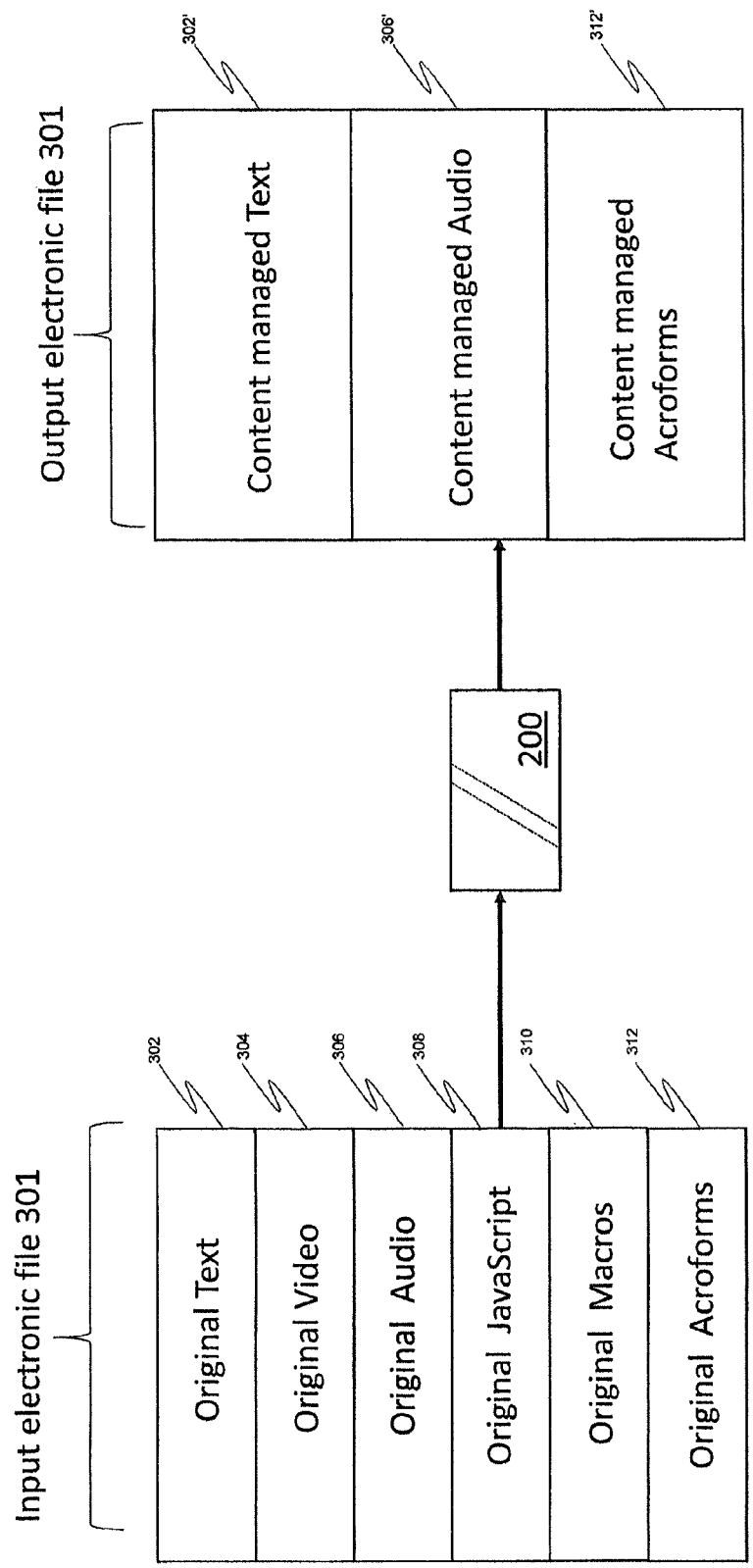
FIG. 5 shows an example (singular) conversion of an original input electronic file to a singular amended (i.e. content-managed) output electronic file, according to an example of the invention.

FIG. 5 shows an example, singular, conversion of an original input electronic file 301 to a singular output amended/content data managed electronic file 301', according to an example of the invention. The output electronic file 301' may be referred to as a policy restrained or content data managed output electronic file.

The conversion shown may be carried out by the singular instance of a content management entity 200 (as described in FIG. 4), or may be carried out by the distributed, but functionally similar, content management version (i.e. including modules 201-204 described in FIG. 3).

The input electronic file 301 may comprise any suitable selection of content data for the particular file type of the input electronic file, and may, for example include such content data such as: original text 302, original video 304, original audio 306, Javascript 308, original macro(s) 310, and original Acroforms 312. The term "original" used here is to say the data in the originating form before any content data management (i.e. policy) according to examples of the invention is applied.

The output electronic file 301' is one where the content management processes have now been applied, based upon, for example the content management policy enforced by the enforcement engine 240, under guidance from the data parameters stored in, e.g., the database 260 (as shown in the FIG. 4).

The output electronic file 301' may therefore comprise a predetermined, content managed, freshly regenerated, new instance of a selection of the original content data from the input electronic file 301, to include (but not limited to), in the example shown in FIG. 5, content-managed text 302', content-managed audio 306' and content-managed acroforms 312'. Thus, we have reduced the amount of content data in the output electronic file 301', to only that allowed by the content data management policy currently in force for the target device, and therefore reduced bandwidth requirements therefor, potentially reduced processing requirements, etc, but more importantly, the risk footprint of delivering the input electronic file is reduced. This is because the output electronic file 301' no longer contains undesirable or dangerous content data—it only contains known good and allowable content data (because it is a freshly regenerated, new instance of the file content data, most likely in a generic tagged representation, only useable by the dedicated provided mobile device-side application/module 104 or 204), so there is no risk of malware infection.

Examples of the invention may also provide multiple conversion capabilities, that is to say, conversion of an original input electronic file 301 to multiple, different, content-managed, new instances of regenerated output electronic files 301', for use by different mobile devices 120, according to different policies (which themselves may be based on static factors such as the respective mobile device capabilities, or dynamic factors such as current wireless network performance/price, as described in more detail elsewhere in this description).

For example, a single input electronic file 301 may contain original content data sets: text 302; video 304; audio 306; Javascript 308; Macros 310; Acroforms 312, and be converted into a set of different output electronic files. These different output electronic files may be, for example:

A first output electronic file comprising: content-managed text 302'; content-managed video 304'; and content-managed audio 306'.

A second output electronic file comprising: content-managed text 302'; content-managed video 304'; and content-managed audio 306'; content-managed Acroforms 312'.

A third output electronic file comprising just content-managed text 302'.

A fourth output file comprising: content-managed text 302'; content-managed video 304'; content-managed audio 306'; content-managed Javascript 308; content-managed Macros 310; content-managed Acroforms 312'.

The different output electronic files, for example first to fourth output electronic files exemplified above, may be provided to different mobile devices (each with different content management policies applied thereto) and/or to the same mobile devices over time (i.e. different dynamic parameters in force. Thus, in the above examples, the first output electronic file may be for provision to a medium capability device 130 with some restrictions on content data (because the device is roaming); the second output electronic file may be for provision to a medium capability device 130 with even less restrictions on content data (because the device is in the local network); third output electronic file may be for provision to a low capability device 120; and fourth output electronic file may be for provision to a high capability device 140 with minimal restrictions on content data (because the device is well resourced, and on the local network—but malware should never be present, hence at least a basic form of anti-malware content management).

The choice of which content data management policies (and in turn restrictions) are applied to any given mobile device using the wireless network 103 is arbitrary—i.e. totally definable by the system administration/user parameters in force and network conditions being experienced. Thus, the invention is not limited to any particular specific combination of content data management policies.

Figure 6:
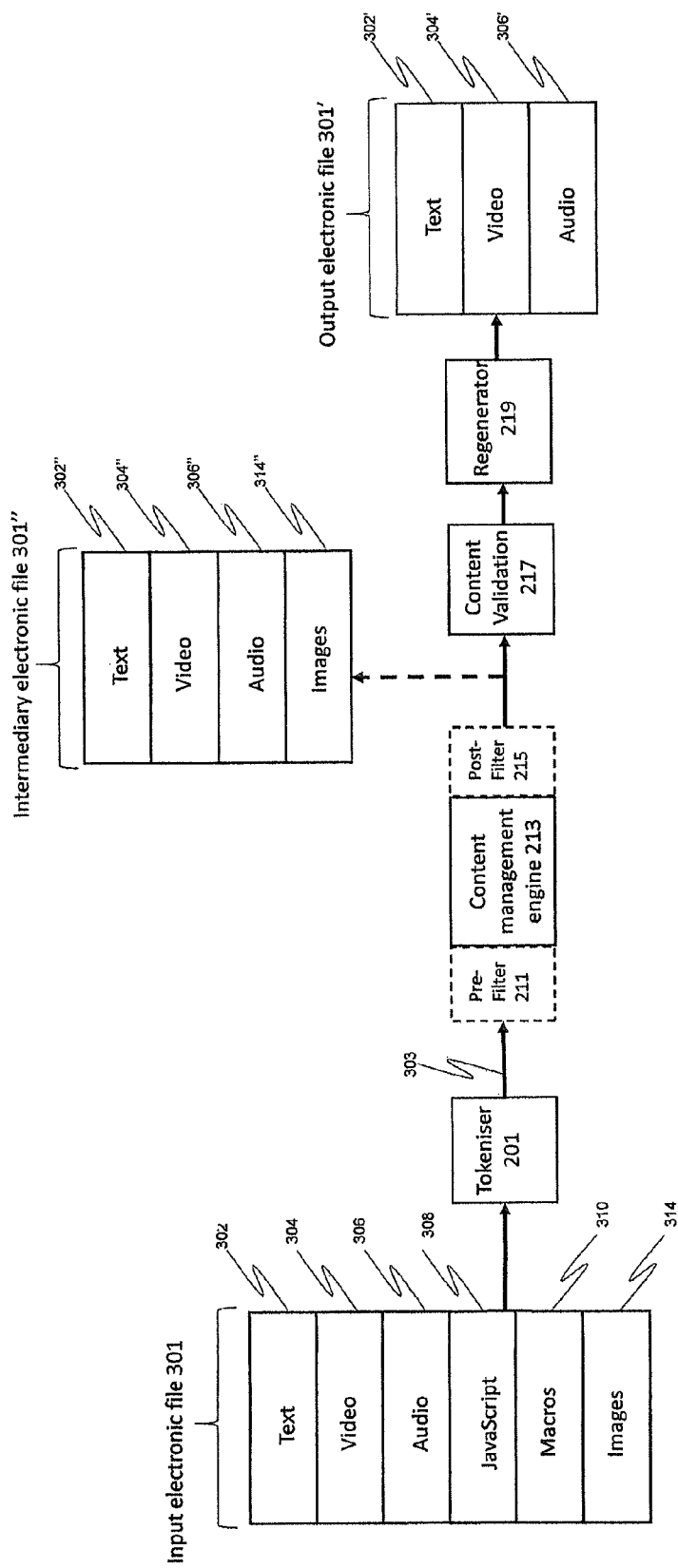
FIG. 6 shows an example (distributed) conversion of an original input electronic file to a singular amended (i.e. content-managed) output electronic file, according to an example of the invention.

FIG. 6 shows an example (distributed) conversion of an original input electronic file 301 to a singular content-managed output electronic file 301', using an intermediate electronic file 301", according to an example of the invention. In broad overview, the example achieves the same overall effect as FIG. 5 except it is performed in a number of steps realised as a distributed architecture so that the tokeniser 201, pre-filter 211, content management engine 213, post-filter 215, content validation 217 and regenerator 219 do not reside within a singular content management entity 200 but as a multitude of entities that are located across the wireless network—e.g. core network switching fabric, mobile device, etc. The benefits of performing the aforementioned processes in a number of steps as opposed to at a single content management entity 200 are that it allows the wireless network infrastructure to spread the processing load across a number of network appliances to maintain throughput. Distributed implementations may also provide cover for different entry points into/out of the wireless network 103, potentially with different content management policies in force, according to entry point. For example, an implementation may have a tokeniser function/ module residing on the mobile handset(s) 120-140 themselves (e.g. within the mobile-side application or module 104/204), so that content data being sent from the handset(s) is also tokenised in preparation for sending out over the wireless network 103, and further processed as described in previous sections (i.e. pre/post-filtering, content management, etc). Whilst the tokeniser 201 in FIG. 3 is shown at one edge of the network, it follows that the tokeniser, or another instance thereof, can (logically, or physically) reside at any edge condition of the core network 110, including within the mobile devices 120-140. Using multiple instances/placements of said tokeniser(s) then allows multiple connections to be supported with data flowing in multiple directions also.

The tokeniser 201 operates on the original input electronic file 301, transforming it to a generic tagged representation discussed below in detail. At point 303, the input electronic file has now been converted into a generic tokenised form. Part of the tokeniser 201 process, as discussed below, may be a basic syntax checker procedure on the tagged generic representation of the original input electronic file content data, which ensures that the basic structure of the tagged generic representation of the original input electronic file content data is syntactically correct. By placing the tokeniser 201 at the edge of the core network 110, it is able to weed out at the earliest opportunity any portions of (up to and including the whole of) input electronic files that are non-conforming to the content management policy being applied, and so reduce the bandwidth requirement of the overall wireless network 103 (because the wireless network 103 is no longer sending data that cannot, or should not be used). Moreover, this removal of specific content data based upon the described content management policy, and which includes a safety aspect of removing malformed/malicious content data, also means that there is no waste of bandwidth sending malformed electronic files, or more importantly, electronic files that contain potentially malicious content data (e.g. a virus, Trojan, etc). In this way, over 90% of malware can be stopped at the initial point of entry of the respective content data in to the wireless network, and especially the core network 110. Furthermore, as the input electronic file's content data is now in a generic tagged representation format, it is effectively inert and cannot be actually be used as malware as it progressing through the other processing stages of the wireless network, i.e. content management engine 213 and content validation module 217, respectively.

The generic tagged representation form of the original input electronic file content data at 303 may then be processed by the content management engine 213, where the predetermined policies may be applied to the input electronic file dependent upon the static and automatic/dynamic factors described previously. This stage of processing may result in an intermediary electronic file 301" (which may be referred to as a tagged generic representation elsewhere in the description) which only constitutes allowable parts of the original content data. The intermediary electronic file 301" may then be processed by the content validation module 217, which enforces the predefined 'known good' rule set and only allows regeneration of content data that conforms to said 'known good' rule set.

A further aspect of the described validation process(es) may include some content data 'corrections' or removal to be performed under certain conditions by the content validation process 217. For example, if an image element 314" is contained within the intermediary electronic file 301" which does not conform to the allowable 'image' rule set for said content data for said original input electronic file type, then this image element can be removed from the overall generic tagged representation during this intermediate stage resulting in an output electronic file 301' which contains only all of the conforming/allowable content data, and none of the content data that is either not allowed by an active policy decision or not allowed because of it being a non-conforming portion of original content data.

Figure 7:
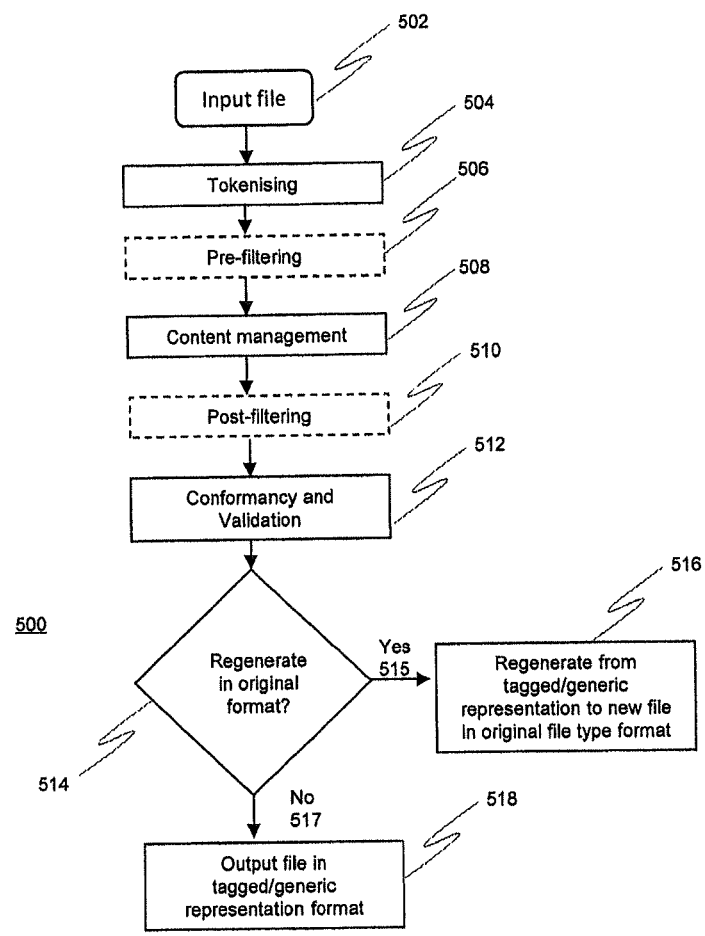
FIG. 7 shows example content data management processes of a method according to an example of the invention.

FIG. 7 shows a content management method according to an example of the invention, as carried out by any or all of the above described hardware, for example as shown in FIGS. 4 and 5.

In broad overview, the method operates upon an incoming electronic file 301, usually containing content data in a predetermined file type specification (and associated arrangement) corresponding to a set of rules for said file type (e.g. receiving a pdf file, in accordance with a pdf file specification). The method may comprise receiving 502 the incoming electronic file 301, then performing one or more passes on the content data within the input electronic file 301, which may include transforming the content data, on each iteration, to a generic-tagged representation. The method may also comprise performing one or more of the discrete functions of: tokenising 504 the incoming electronic file 301; pre-filtering 506 (i.e. 'noise' removal); content management 508; post-filtering 510 (i.e. cleaning the file before output); conformancy and validation 512 of said tokenised, filtered and content-managed content data (e.g. against a set of reasonable limits and good criteria); and making a regeneration decision 514. Where a 'yes' 515 for the regeneration decision 514 means regenerating 516 the content data into an output electronic file of the same file type as the original input electronic file, and where a 'no' 517 means outputting the content data in a tagged generic form/format 518, for subsequent use elsewhere in the system, or by another entity within the overall system, all in the generic domain.

A further feature potentially provided by examples of the invention is the ability to correct any often occurring, but perhaps relatively minor, deviations from the validation rule set. For example, where text should have text line feeds and carriage returns at the end of each nominal line (when viewed), but often text may be lazily formed to only use carriage return in such an instance. Another, similar, issue may occur when the line feeds/carriage returns in the text within a certain text area rely upon "word wrapping" techniques supplied by the reader/writer software, and hence has no carriage return or line fee control characters within, as such.

Where an example provides this sort of corrective feature, the content management engine may be arranged so that these minor 'corrections' to the file format are applied during the content management process 213. The correction feature is typically limited in scope, so, the system may be arranged to list what it will be allowed/able to correct (i.e. a correction "white list") and therefore anything outside of this allowed set of corrections is not corrected. Put another way, the system can only correct basic listed, previously known, commonly occurring errors, and anything outside that is considered too extreme for automatic correction. The list of known errors may be updated at any time to reflect more recent data, or a level of corrective measure—i.e. the system can be set to be very pedantic, or more permissive.

The component sub-methods 504-518 are described in more detail below, under respective headings.

The Tokeniser

The Tokenising process/sub-method 504, is typically carried out by the tokeniser 201, which may be located at multiple points in the overall system, as described above with reference to FIG. 4, and indeed multiple instances may be used in some examples (i.e. the tokeniser 201 may be consider a resource common to each of the other content management processes 210).

The tokenising process 504 may be responsible for extracting content data from the existing input electronic file 301 and representing it in what we refer to above as a tagged/generic representation. This tagged/generic representation may then be used by the further sub-modules/processes (e.g. pre-filtering module 211, content management module 213, post-filtering module 215, validator module 217, a regenerator module 219), so that these subsequent sub-modules do not need to be file specific—i.e. they operate in the generic tagged domain, and as such as easily re-used for all forms of file based content data/input electronic file type. They are file type agnostic. This provides efficiencies of processing and system management, especially the provision of content management to new forms of file.

The tokenising process 504 may have a set of mappings predefined between input electronic file 301 and the generic tagged representation. This is to say, each input electronic file 301 has a mapping between each content data sub-portion of the input electronic file and the respective portion of the tagged/generic representation; for example how it is to be represented in binary content and tags that are used in said transformation. For example, the original text portion 302 may have a mapping to the tokenised form of the text content data, the original video portion 304 may have a mapping to the tokenised form of video content data, the original audio portion 306 may have a mapping to the tokenised form of audio content data, etc.

An example is provided below to highlight how a representation of original text content data from an input electronic file 301 (the track title/composer info from an mp3 music file, in this example) may be placed into a tagged generic form, whilst transforming the whole of the input electronic file (mp3) into the overall tagged generic representation.

An mp3 music file stores binary encoded data in blocks and also has string based metadata (including the text) embedded in the mp3 electronic file in the form of ID3 data tags—these tags typically relate to textual information regarding the music that is encoded within the mp3 electronic file, such as (but not limited to): artist, genre, copyright and so forth.

In the example below, we see that the tokenising process 504 has transformed the original content data (title text) from the original input electronic file 301 into a generic token based tagged representation of the composer MP3 tag. In this case the tokenising process 504 has a mapping between the original mp3 "TCOM" binary format tag and a generic "glasswallTag:mp3TCOM" token available and so is able to transform the respective text content data into this tagged generic representation, under control of the content management policy that is currently in force. This is to say, the tokenising process 504 takes the original text content data and rearranges it into a standardised generic form for use in a standardised way, by the subsequent process/(sub-)modules.

In the below tagged sample record (i.e. in a tokenised form, or "token"), we see that the tag contains the minimum and maximum limits appropriate for this text content data (which, in this example, is the track composer field), as well as a validation function entry which may be called by the validation cycle later on, in order to validate this tagged record. This allows for individual records to have unique validation functionality where appropriate.

```
<glasswallRecord:mp3TCOM>
    representation = "text-restricted"
        minLength = "1"
        maxLength = "30"
        value = "ComposerX"
        regenerate = "Yes"
    validationFunction = "validateTcom"
</glasswallRecord:mp3TCOM>
```

Note that the 'regenerate' entry field above may be used to determine whether this tagged record (i.e. piece of text content data) is allowed to be regenerated based on current content management policy. Whilst this is presented above in a binary yes/no context, it may comprise further/more potential values, therefore allowing a more nuanced arrangement of regeneration schemes to be applied. This tokenising process 504 may also be responsible for performing the basic syntax checking discussed in the previous section, as whilst it is parsing the input electronic file 301 and performing transformation of the original input electronic file 301 to the generic token intermediate representation of the file 301".

The Pre-Filter Cycle

The Pre-filtering 506 step/method stage may process the tokenised file, i.e. the tagged generic representation created by the tokenising process 504 described above, in order to remove content data that is unreferenced or unreachable when parsing the original input electronic file 301 (but may also be arranged to do similar within the tagged generic representation itself, as well or instead) using a prearranged parsing approach bespoke to the described content management entity 200/methods 500 of examples of the invention (and may, for example, use a byte by byte, linear approach, or the like) as opposed to the standard recommended parsing approach for the specific type of input electronic file format/specification being processed (e.g. the known approved standard pdf parsing scheme for a pdf file, the known approved standard Word doc(x) parsing scheme for a doc(x) file, etc). In this way, the described content management apparatuses and methods avoid being subverted by a maliciously formed/mal-formed input electronic files 301 that would otherwise be the case for a normal reader function. Moreover, this approach means that content data that may otherwise be missed by the standard parsing techniques is fully taken into account, and fully removed if necessary, leaving nothing unexpected in the output electronic file 301'. The described approach may equally be applied to a multitude of differently structured data file formats/specifications including, but not limited to: Microsoft Word doc(x), xls(x), and ppt(x), rtf text (or similar more universal text) file type specifications, MP3/WAV (or similar more universal audio) file type specifications, and .mp4/vob (or similar more universal video) file type specifications. Essentially, any file type format specification, for any sort of content data, can be dealt with by examples of the invention, as they propagate through any type of wireless network, including but not limited to, text messages, emails and web traffic.

Unreferenced or unreachable data often occurs within electronic files carried over wireless networks, for example when applications that write electronic files perform a 'quick save' and data is appended to the end of the electronic file and the stale data is simply left unreferenced (i.e. the quick save had simply removed or changed the pointers to the respective content data in the "quicksaved" electronic file, rather than removing the original data/re-writing the electronic file out without the unreferenced data therein). The described pre-filtering process 506 is like a stencil in that an imaginary pen is lowered for content data that is referenced and raised for content data that is unreferenced, so that in an later regeneration step, which using the tags noted above (e.g. regeneration "yes/no" tag) the unreferenced content data is effectively stencilled out. This pre-filtering process 506 removes superfluous unreferenced content data (that by its very nature is not required in that electronic file, and hence not to be regenerated into the new instance of the electronic file) by removing this unreferenced content data in a first pass so any further process modules/sub-modules can process the generic tagged representation of the electronic file without this 'noise' which could otherwise prove misleading for the further content management and validation processes later in the sequence, or simply waste later used processing resources and bandwidth. Put another way, the "regenerate" tag may be used to determine whether the particular tagged content data is to be regenerated back into the fresh new instance of the output electronic file, in the same file type specification as the original input electronic file (or tagged generic representation) or is simply left behind. Again, the whole thrust with this approach is not removing bad content data from the original file (and hence leaving behind as yet unknown bad content data), but only regenerating known-good content data that is positively determined to be good, and desirable, into the content managed (i.e. substitute) output electronic file.

The Content Management Engine

The next stage in the content management processes 210 may be the content management method step 508, what may be for example carried out by the content management module 213. The content management engine may be viewed as a cleaning cycle. The content management method step 508 allows the application of user/system administrator-defined content management policies, resulting from the automatic and manual policy set-up/decisions discussed above (i.e. the manual portions of which have been set up previously, and the automatic portions that are dynamically changing, for example according to network conditions, at this point in time). The content management method step 508 allows content data deemed undesirable (and hence not to be regenerated) such as, but not limited to Metadata, JavaScript, Macros and Open Actions, to be removed from the tagged generic representation of the content data (and therefore never to reach the final output electronic file 301'), before the content data reaches the regeneration stage.

This approach also has a further benefit in that this content management cycle is also able to normalise an input electronic file 301 or document to a required specific version (i.e. a predefined current or previous version of an ever changing file type specification—e.g. revising a received pdf version 1.4, down to a pdf version 1.3, rather than continue using pdf v1.4, or revising down from .docx to .doc in Microsoft Word, etc). This may be a particular benefit when a newer version of a file type specification or format has features that are not desirable (as they add little use to an organisation's workflow, but increase the threat footprint, for example by containing unused functionality that can be exploited in some way).

Alternatively, where an organisation has not updated to the latest version of software on some devices, but has on other devices, e.g. productivity software, such as Microsoft Office, (so the respective newer file type may be unreadable on older installations of the software, because some mobile device's pre-installed productivity software is a legacy version), this problem of interoperability may be overcome by using the content management approach described, because the overall process is able to ignore or revise down content data or content data type that was introduced in a later released file type specification than a desired, standardised, earlier file type specification.

The Post Filter Cycle

The post filter cycle 510 may be utilised to ensure that the content management cycle 508 correctly cleaned the desired overall content data of any undesired content data and did not leave any unreferenced links behind. This post filter cycle 510 is effectively the same functionality as the pre-filtering process 506, in that any un-referenced links or un-referenced content data is removed by a stencil approach, but applied after rather than before. Using dual instances of the filtering provides robust protection against incomplete removal of undesirable content data, which may otherwise occur if an iterative removal approach is not taken (e.g. in a tree structure, where children content data was originally referenced, but was reliant on a parent content data portion/relationship, and the parent content data was removed at the first pass—so the children's validity has changed due to the action of the first filter pass). Put another way, this iterative filtering approach is utilised because it is cumbersome and sometimes impractical to clean content data from a tagged generic representation of the content data from an input electronic file in single passthrough and the described apparatuses and methods effectively marks content data as unreferenced in the content management pass and then simply "stencils out" the unreferenced content data in the post-filtering cycle 510.

The Validator

A conformancy and validation stage 512, for example carried out by the validator 217 in FIG. 4, is responsible for ensuring the content data represented in the generic tagged representation conforms to any predefined limits and rules applied to that form of content data (e.g. the length of field text limit, as shown in the above MP3 example). For example, in the above sample, the conformancy and validation stage 512 may inspect the first three fields and then ensure that field four: <value="ComposerX"> conforms to the specific type and limits set out previously for this content data, when taken from a mp3 file type specification as the input electronic file 301. In the above case, we see that the content data in the 'value' field should be of type text-restricted, which defines a subset of restrictive text and that the text length should be between 1 and 30 characters long. If the content data in the 'value' field does not conform to these known-good criteria, then the record is not regenerated and is marked as such in the appropriate 'regenerate' field. The conformancy and validation stage 512 may also have some basic predefinition of default or generally allowable content data enforcement limits and rules, which may be overridden or supplemented by the input electronic file type specification specific predefined limits and rules noted above. The use of such default limits and rules may particularly help when other, as yet unheard of/encountered/unsupported file types are encountered (for the first time) and must be dealt with in some rudimentary way, if only to ultimately exclude their content data entirely.

The tagged generic representation may also have an entry for a validation routine function that the validator will call out to—this can be a specifically provided (for each file type specification that can be handled by the described apparatus(es) and method(s)) validation routine, or a more generically applicable validation routine, or indeed any function that may be considered useful in any given situation. This enables the generic process to be tailored and extended to suit specific functionality that does not fit into a simple validation category such as text or characters, or can simply be used to notify the system (or administrators thereof) of newly encountered content data type(s), file type(s) or functionality.

A further benefit of having separate discrete file type specific validation functionality and placing the validation routine 512 as the last enforcement process, is that if any implementation error(s) has caused the content management process to not correctly clean or sanitise a portion of content data, then the subsequent validation routine 512 will be able to pick it up instead. For example, because that unwanted portion of the content data is not on its known-good list.

The Regenerator

The regenerator 219, or any (multiple) instances thereof, parses the tokenised, i.e. tagged generic representation of the, content data and creates a substitute, freshly created, new instance of an output content-managed electronic file, either in the same or similar format to the original input electronic file 301 (e.g. converting an input pdf file into a regenerated pdf output file, or converting an input pdf file into a pdf output file of lower version, etc), or outputting the content data into another form of specific output file (e.g. converting an input pdf file into a regenerated Word .doc output file). Effectively, this process is the reverse of the tokeniser 201 and whereas the tokeniser 201 has a mapping (e.g. look up table arrangement) between the original electronic file content data and suitable tags to represent said content data in the generic tagged representation in the generic tagged/tokenised domain, the regenerator may have the inverse mapping, i.e. a mapping between the generic tagged representation/tokenised form of tags, to that of the original electronic file content data portions.

Alternatively, the output electronic file 301' may in fact remain as a generic tagged representation, so that further processing can be harmonised/made more efficient. For example, encryption, compression, and other processing functions may perform better, if they can know exactly where every type of content data portion is located, for all the different file type specifications able to be handled by the described apparatus(es) and method(s), and act accordingly. Whereas, if the same processing function has deal with different specific file types, and hence different content data forms and locations within those file types, then the further processing functions become more complex to implement and/or unwieldy to create, manage and apply. Basically, further (subsequent) processing functions (of any type) get more efficient if their input data is more consistent.

Taking the mobile device specific example, then this would allow a single generic form of bespoke reader application on a mobile device, e.g. provided within mobile device application/module 104 or 204, to deal with (e.g. render or even write to) any file type specification, as opposed to needing a multitude of different readers, and updates therefor. Put another way, the transformation load of converting from the original input electronic file 301 (i.e. transformation into the generic tagged representation form) can be/has been put into the wireless network 103 (or even core network 110 thereof), rather than the mobile device 120-140 itself. As a result, the network infrastructure 110 has performed the task of determining the allowable content data as well as representing the content data in the generic form. Therefore, the mobile devices, 120, 130 and 140 may only have to be concerned with rendering content data from a singular generic representation format onto, for example, their display. As a result they are no longer concerned with the specific file-type specification format of the original electronic file 301 and all of the multitude of combinations thereof. This alleviates the mobile device from requiring a multitude of readers/parsers for the large number of content data in differing forms of the input electronic file 301 and now the mobile device only requires a singular reader—that of the generic tagged representation.

Figure 8:
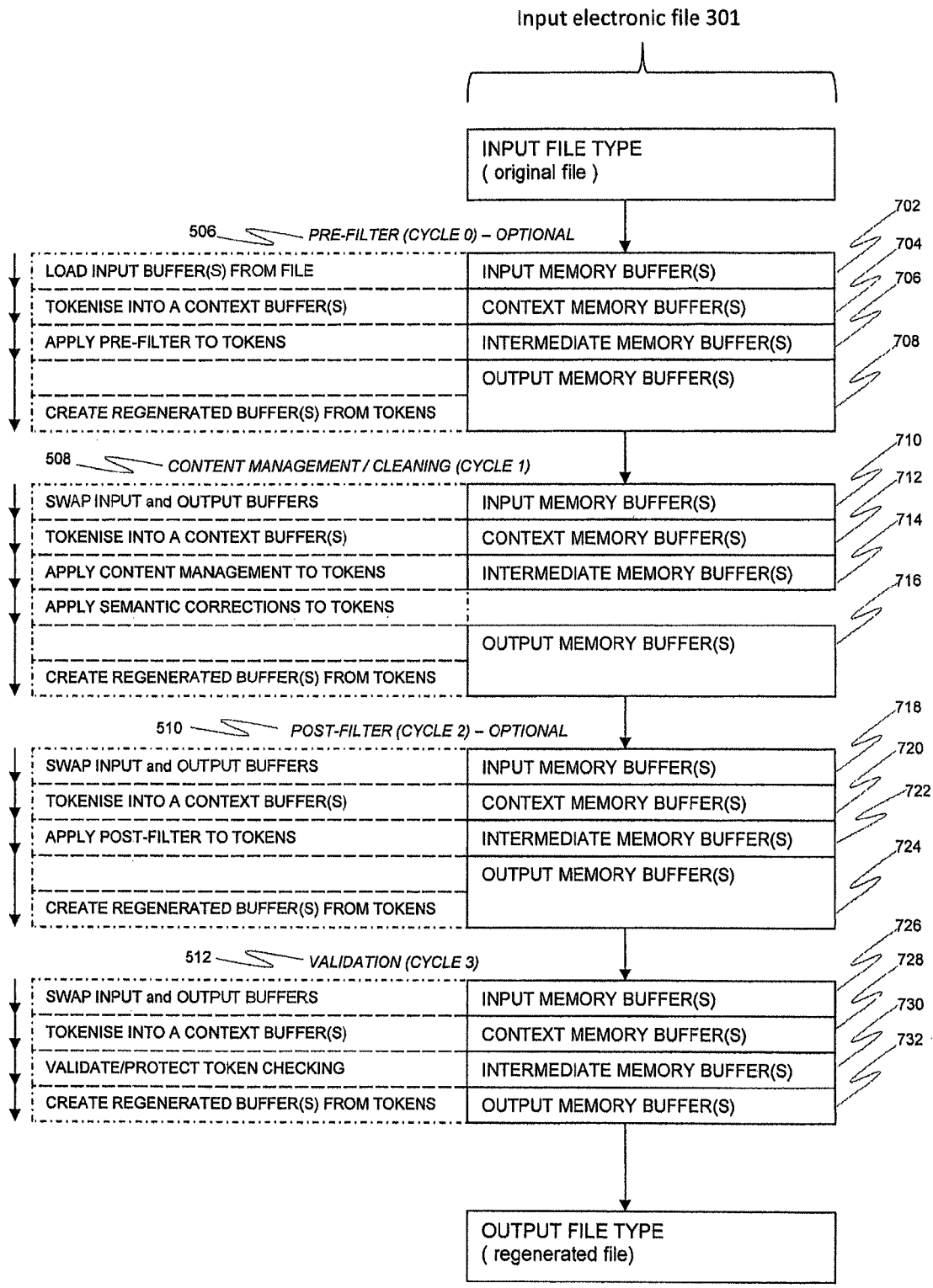
FIG. 8 shows an example tokenisation and regeneration portion of a method according to an example of the invention.

FIG. 8 describes a further more specific example detailing how electronic file content data may be stored between and during each of the aforementioned processes pre-filtering process 506, content management 508, post filter 510; and content conformancy and validation cycle 512. The input electronic file 301, is read into an input memory buffer 702 so that it can be read quickly and contiguously for the next stage, 704 which is a context buffers stage that is concerned with tokenising the file into the tagged generic representation (as discussed above), with an intermediary form being processed by intermediate buffers 706 which performs the pre-filtering process, as discussed previously. A key difference with this example is that it regenerates the tagged generic representation of the original input file content data into its original form, using output buffer 708 at the output of each processing stage (506, 508, 510, 512) to ensure that no stale content data, in tokenised form, is unwittingly allowed to pass through to the subsequent processes. By regenerating the file content data and then re-tokenising at each stage, it can be guaranteed that the content data is 'fresh' content data as a result of the last processing cycle and not that of some legacy content data from a number of processing cycles earlier. This particular example may be relevant for a situation where the content management engine 210 is not distributed, but is concentrated at a single location or physical device, such as content management entity 200 in FIG. 2. Where the content management engine 210 is distributed, as described in FIG. 3, this regeneration at each step may not be necessary. This is because each process can be guaranteed to have 'fresh' data because it only performs a single process as opposed to all processes at once, with the same memory.

FIG. 8 shows a portion of the example method of FIG. 7 in more detail, and how different memory buffers are used in particular. This example shows a case where there is a tokeniser and regenerator applied at each sub-module step—i.e. there is a tokeniser at each of positions 212, 214, 216 and 218 in FIG. 4, and a regenerator at each of positions 222, 224, 226 and 228. The example portion shown comprises, after initial input of the electronic file 301, four cycles—cycle 0 to cycle 3.

Cycle 0 is the pre-filter cycle 506, and is shown as comprising a load of input memory buffer(s) from the input electronic file—this may be done, for example, by loading the file content data into a RAM buffer, which allows fast access to the content data by/for the subsequent further sub-processes discussed shortly. The data in input memory buffer (s) 702 may then be tokenised, using the tokeniser

201, as previously described, the output of which is stored in a token context buffer 704. The Pre-filter process 211 is then performed on the generic representation of content data, in the context memory buffer 704, with the resultant content data stored in the intermediate buffer memory 706. Then, finally (for this sub-module), the content data may be regenerated in the original electronic file type specification (e.g. pdf) form using the output memory buffer 708, or alternatively the generic representation is simply copied to this output memory buffer 708, in preparation for the next cycle/process, when no regenerator is actually used at the end of the pre-filter sub-module process 506 (i.e. the data is kept in the generic tagged tokenised representation form until the very end).

The next cycle, cycle 1, is the content management cycle 508 (which may, and does in this case, include a cleaning process), Here, the electronic data stored at the earlier stage in output buffer 708 is copied to the input memory buffer 710 for the next stage 508—effectively a memory buffer swap, where it is then tokenised, if necessary, using the tokeniser 201, into (another or the same) token context buffer 712. The content management process 213 is then applied to the content data in the context memory buffer 712, and based on either the static or dynamic parameters detailed earlier, the resultant content-managed content data is stored into intermediate memory buffer 714, where a cleaning process may be applied—a semantic correction cleaning process in this example (but other corrections, as discussed above, within limits, are also envisaged for use at this point in the overall process). The regenerator 219 may then regenerate the electronic file content data to the output memory buffer 716, either in the original electronic file format (i.e. proper regeneration) or that of the generic representation (a copy only data move function).

Cycle 2 is the Post filter process 215, and may comprise loading the electronic representation from 716 into the input memory buffer 718 for this stage. Again this may be a simply memory buffer data swap, or even memory buffer naming/addressing swap. The tokeniser 201, may then transform the electronic representation of the content data processed so far into a generic, tagged, representation using the context memory buffer 720. The post filter process may then be applied to the electronic representation in the context memory buffer 720, with the resultant further processed (post-filtered, in this case) content data being output written to the intermediate memory buffer 722. From this intermediate memory buffer 722, the content data is then either regenerated back to the original electronic file type specification (or functional equivalent, such as another file type specification suitable for the type of content data being allowed though the system) or it is output in its tagged generic representation form to output memory buffer 724.

The final cycle is cycle 3. This is a validation cycle 512, which reads the pre-filtered, content-managed and post-filtered content data from the output memory buffer 724 and stores this into a an input memory buffer 726 for this stage (again by swapping the input/output memory buffers in the example shown in FIG. 8). The tokeniser 201 may then transform the content data into a generic representation and stores this in a content memory buffer, 728. The validator 217 may then perform the validation routines as previously described, and the resulting validated content-managed and filtered content data is then written to the intermediate memory buffer 730. Finally, the regenerator outputs the now fully processed content data, either in a tagged generic representation, or in the original (or conversion target) electronic file type specification using output memory buffer 732, ready to be committed to disk as the output electronic file 301'.

In the above description of FIG. 8, a single buffer (e.g. input memory buffer, context memory buffer, intermediate memory buffer, etc) is described at each step, but as shown in the figures, there may be multiple memory buffers used for each, dependent on memory architecture and/or content data form (e.g. size, etc). There may be a single memory buffer used per content data type being processed—e.g. a memory buffer for audio, another memory buffer for video, etc.

As described above, the file type specification used at different points in the overall content management process may change—i.e. another file type specification may be used when it is more suitable for the type of content data being allowed though the system. In the simplest form, this allows conversion from one input file type specification to another output, or intermediate, file type specification (e.g. a conversion from Microsoft Word .doc to more generic Richer Text Format .rtf). However, in more complex implementation scenarios, a conversion may be more significant, in that a file converts as content data is disallowed. For example, an input pdf file with pictures, audio, links and text may be converted to a simple image file for just the picture content data—i.e. as content data is disallowed, and hence no longer included in the regenerated versions (and therefore effectively "stripped off", the output and/or intermediate electronic file used may be a lesser file type specification not able to contain the disallowed content data—as it is no longer necessary to use a file type specification that can contain the disallowed content data.

The invention may also be implemented as a computer program product running on programmable apparatus comprising one or more processors operating within, for example, a computing system, such as content management entity 200, said computer program product at least including portions of executable code arranged to perform one or more steps of any method according to examples of the invention when run on the programmable apparatus, such as the computer system. Examples may be embodied as firmware stored within, or at least accessible by, suitable hardware, such as networking hardware, including wireless networking hardware such as, but not limited to mobile devices for connection to one or more wireless networks. The wireless networks that may be used in examples of the invention include both terrestrial and satellite-based wireless networks.

A computer program product may be formed of one or more instructions that are executable by the one or more processors, or sub-portions thereof, such as processing cores, co-processors or the like. The computer program product may comprise a specific application program and/or a portion of an overall operating system. The computer program product may for example include one or more of: a server or servlet, an object method, a function, a procedure, an object, a subroutine, an executable application, an app or applet, source code or source code portion, an object code, a shared or linked library/dynamic load library and/or any other sequence of microcode, function calls or instruction set(s) designed for execution on a suitable one or more processing resources, such as processors, processing core(s) or processing unit(s).

The computer program may be stored on any suitably arranged storage means accessible by said one or more processing resources, which may include volatile or non-volatile storage means, for example, but not limited to:

optical storage means (e.g. CD-ROM, DVD, Blue ray, et al), RAM (e.g. Dynamic RAM, Static RAM, Non-Volatile RAM, etc), magnetic storage means (e.g. as hard disk drives, magnetic tapes, etc), etc. Examples that implement aspects of the invention are not limited to their specific form, but rather, are limited only by the functionality to store data for manipulation, and/or control said manipulation of the same, similar or different data. The storage means may also comprise network attached storage, and may include cloud based storage technologies; to include any diversely maintained data storage means, which in themselves may comprise or at least include databases, instances of databases, logically and/or physically separated databases and the like. The full range of data storage technologies available now or created in the future, are envisaged for use with at least one example of the present invention. The envisage storage means also include any suitable transmission technology, such that a transmission wave or similar EM wave may also be used to store data, at least transitorily.

In the foregoing specification, the invention has been described with reference to specific examples of embodiments of the invention. It will, however, be evident that various modifications and changes may be made therein without departing from the broader scope of the invention as set forth in the appended claims.

Any form of connection(s) discussed in this document, for example where an entity is described as being operably coupled/connected to another, may be any type of connection(s) suitable to transfer data carrying signals from or to the said entities, units or devices, and may include sending data carrying signals via intermediate entities, units or devices. Accordingly, unless specifically stated otherwise or implied, the connection(s) may include any one or more of: direct connections; indirect connections; a single connection; a plurality of connections, bi-directional connections; unidirectional connections. The connections may operate in any way that enables transfer of data between end points, or indeed, nodes along the connection (s) length, for example serially, in parallel or in a multiplexed manner (e.g. multiplexed by time, frequency, phase, etc.

Those skilled in the art will recognize that the boundaries between different logic blocks, circuit blocks or entities described herein are merely illustrative and that alternative examples may merge logic blocks, circuit blocks or entity elements or utilise one or more alternate decompositions of functionality upon various logic blocks, circuit block or entity elements. Thus, it is to be understood that the processing architectures depicted herein are merely set out as an example, and any similarly functional arrangements may be used instead.

Any boundaries described within the specific example(s) laid out herein, are only illustrative. Any described operation, including multiple discreet operations may in fact be combined into a single operation, equally a single operation may in fact be distributed to form additional sub-operations and the said operations/sub-operations may be executed at least partially overlapping in time, dependent upon the required timings of the or each entity (or entities) within the overall described exemplary system.

However, other modifications, variations and alternatives are also possible. The specifications and drawings are, accordingly, to be regarded in an illustrative rather than in a restrictive sense.

Unless otherwise stated as incompatible, or the physics or other inherent teaching of the embodiments prevent such a combination, the features of the following claims may be integrated together in any suitable and beneficial arrangement. This is to say that the combination of features is not limited by the claims specific form, particularly the form of the dependent claims, such as claim numbering and the like.

The invention claimed is:

1. An anti-malware mobile content data management apparatus, for use in managing content data within an input electronic file containing content data to be sent over a wireless network comprising at least one mobile device being served by the wireless network, comprising:
   at least one processor;
   at least one memory, the at least one memory including instructions that, when executed by one or more of the at least one processor, implement the following:
   a regenerator to regenerate a new content data;
   at least two tokenisers to tokenise the content data contained within the input electronic file into a tagged generic representation of the content data, the at least two tokenisers operative to generate the tagged generic representation of the content data regardless of a language syntax used in the content data, the tagged generic representation of the content data specifying a validator function to use in validating the tagged generic representation of the content data, each of the at least two tokenisers arranged to re-tokenise the new content data before a subsequent processing step;
   a content management engine to apply a predetermined content management policy to the tagged generic representation of the content data to form content-managed tagged generic content data, the content-managed tagged generic content data omitting a portion of the tagged generic representation of the content data based on the predetermined content management policy; and
   a validator to create validated content-managed content data by being arranged to ensure the content-managed content data represented in the content-managed tagged generic representation conforms to any predefined limits and rules applied to each form of content data appearing in the content data of the input electronic file;
   wherein an output of the validator is operably coupled to the wireless network, and arranged to provide a substitute output electronic file derived from the validated content-managed content data.

2. The anti-malware mobile content data management apparatus of claim 1, the memory including further instructions that, when executed by one or more of the at least one processor, implement at least one filter to filter the tagged generic representation of the content data to remove unreferenced or unreachable content data.

3. The anti-malware mobile content data management apparatus of claim 1, wherein the regenerator is operably coupled to the validator and arranged to provide the substitute output electronic file derived from the validated content-managed content data by regenerating a new instance of an electronic file in a predetermined file type specification for onward use by the wireless network instead of the electronic file or by outputting the validated content managed content data as a tagged generic representation.

4. The anti-malware mobile content data management apparatus of claim 1, wherein the content management engine is further configured to normalise the substitute output electronic file to a predetermined version of the predetermined file-type specification.

5. The anti-malware mobile content data management apparatus of claim 1, the memory including further instructions that, when executed by one or more of the at least one processor, implement an enforcement engine operably coupled to the content management engine and arranged to provide content management policy parameters indicative of, or for use in applying, the content management policy to be in force.

6. The anti-malware mobile content data management apparatus of claim 1, the memory including further instructions that, when executed by one or more of the at least one processor, implement a network parameter monitor operably coupled to the enforcement engine and arranged to provide network parameters to the enforcement engine, for use in setting up or amending the content management policy parameters.

7. The anti-malware mobile content data management apparatus of claim 6, wherein the network parameters include wired network performance data and wireless network performance data.

8. The anti-malware mobile content data management apparatus of claim 5, wherein the mobile content data management apparatus further comprises a user interface connector operably coupled to the enforcement engine and arranged to provide content management policy parameters from at least one of: at least one mobile device being served by the wireless network, the wireless network itself, or a user of the at least one mobile device being served by the wireless network.

9. The anti-malware mobile content data management apparatus of claim 5, wherein the content management policy parameters are derived from location-based information provided from a location sensor within the at least one mobile device or within a wireless network entity serving the at least one mobile device.

10. The anti-malware mobile content data management apparatus of claim 1, wherein the mobile content data management apparatus is located within the wireless network, or at an edge of the wireless network to act as an interface with another communications network, to thereby content-manage electronic files passing through the wireless network, or between the wireless network and the another communications network.

11. The anti-malware mobile content data management apparatus of claim 1, wherein the mobile content data management apparatus is a distributed mobile content data management apparatus having sub-modules arranged to carry out processing stages at different locations within the wireless network.

12. The anti-malware mobile content data management apparatus of claim 1, wherein the mobile content data management apparatus is a single instance mobile content data management apparatus, and the single instance further comprises at least a second filter to filter the tagged generic representation of the content data to remove unreferenced or unreachable content data after the content management engine has applied a predetermined content management policy to a filtered tagged generic representation of the content data.

13. The anti-malware mobile content data management apparatus of claim 1, wherein the anti-malware mobile content data management apparatus is further configured for use with a mobile device including a mobile device-side application, the mobile device-side application including a generic reader function to allow use and/or manipulation of the content data contained within any instance of tagged generic representation of the content data, and a management console portion operable to allow a user of the mobile device to setup or amend the content management policy to be applied to the same mobile device, or other mobile devices served by the wireless network.

14. The anti-malware mobile content data management apparatus of claim 1, wherein the anti-malware mobile content data management apparatus is operative to regenerate only known-good content data in the tagged generic representation of the content data, the validated content-managed content data, or the substitute output electronic file.

15. The anti-malware mobile content data management apparatus of claim 1, wherein the predefined limits and rules pertain to a form of the input electronic file.

16. The anti-malware mobile content data management apparatus of claim 1, wherein the tagged generic representation of the content data includes one or more tag(s) to represent the content data.

17. The anti-malware mobile content data management apparatus of claim 1, wherein the predetermined content management policy identifies the portion of the tagged generic representation of the content data as potentially malicious content.

18. The anti-malware mobile content data management apparatus of claim 1, wherein the regenerator is operative to regenerate the new content data from any of the tagged generic representation of the content data, the content-managed tagged generic content data, and the validated content-managed content data.

19. An anti-malware mobile content data management method, for use in content-managing an input electronic file containing content data to be sent over a wireless network comprising at least one mobile device being served by the wireless network, the method comprising:
    providing multiple tokenisers at different locations within a content management engine, each arranged to re-tokenise the content data before a subsequent processing step;
    tokenising the content data contained within the input electronic file into a tagged generic representation of the content data, regardless of a language syntax used in the content data, the tagged generic representation of the content data specifying a validator function to use in validating the tagged generic representation of the content data;
    content-managing the tagged generic representation of the content data to apply a predetermined content management policy to the tagged generic representation of the content data to form content-managed content data, the content-managed tagged generic content data omitting a portion of the tagged generic representation of the content data based on the predetermined content management policy;
    validating the content-managed content data represented in the tagged generic representation to ensure said content-managed content data conforms to any predefined limits and rules applied to each form of content data appearing in the content data of the input electronic file, to form validated content-managed content data; and
    outputting a substitute output electronic file derived from the validated content-managed content data.

20. The anti-malware mobile content data management method of claim 19, further comprising filtering the tagged generic representation of the content data to remove unreferenced or unreachable content data.

21. The anti-malware mobile content data management method of claim 19, further comprising regenerating the content data into a substitute output electronic file derived from the validated content-managed content data by regenerating a new instance of an electronic file in a predetermined file type specification for onward use by the wireless network instead of the electronic file or by outputting the validated content managed content data as a tagged generic representation.

22. The anti-malware mobile content data management method of claim 19, further comprising normalising the substitute output electronic file to a predetermined version of the predetermined file-type specification.

23. The anti-malware mobile content data management method of claim 19, further comprising providing content management policy parameters indicative of, or for use in applying, the content management policy to be in force via an enforcement engine operably coupled to the content management engine.

24. The anti-malware mobile content data management method of claim 19, further comprising providing network parameters to the enforcement engine via a network parameter monitor operably coupled to the enforcement engine, in order to provide means for setting up or amending the content management policy parameters.

25. The anti-malware mobile content data management method of claim 24, wherein the network parameters include wired network performance data and wireless network performance data.

26. The anti-malware mobile content data management method of claim 19, further comprising providing content management policy parameters, via a user interface connector operably coupled to the enforcement engine, from at least one of:
  at least one mobile device being served by the wireless network, the wireless network itself, or a user of the at least one mobile device being served by the wireless network.

27. The anti-malware mobile content data management method of claim 26, further comprising deriving the content management policy parameters from location-based information provided by a location sensor within the at least one mobile device or within a wireless network entity serving the at least one mobile device.

28. The anti-malware mobile content data management method of claim 19, further comprising locating the mobile content data management apparatus within the wireless network, or at an edge of the wireless network to act as an interface with another communications network, to thereby content-manage electronic files passing through the wireless network, or between the wireless network and the another communications network.

29. The anti-malware mobile content data management method of claim 19, further comprising distributing sub-modules of the mobile content data management apparatus across different locations within the wireless network, each sub-module arranged to carry out a different processing stage of an overall content management process.

30. The anti-malware mobile content data management method of claim 19, further comprising at least a second filtering stage to filter the tagged generic representation of the content data to remove unreferenced or unreachable content data after the content management engine has applied a predetermined content management policy to a filtered tagged generic representation of the content data.

31. The anti-malware mobile content data management method of claim 19, wherein the anti-malware mobile content data management method is operative to regenerate only known-good content data in the tagged generic representation of the content data, the validated content-managed content data, or the substitute output electronic file.

32. The anti-malware mobile content data management method of claim 19, wherein the predefined limits and rules pertain to a form of the input electronic file.

33. The anti-malware mobile content data management method of claim 19, wherein the tagged generic representation of the content data includes one or more tag(s) to represent the content data.

34. The anti-malware mobile content data management method of claim 19, wherein the predetermined content management policy identifies the portion of the tagged generic representation of the content data as potentially malicious content.

35. One or more tangible non-transitory storage means storing computer code that, when executed by a processor, operate to perform:
  providing multiple tokenisers at different locations within a content management engine, each arranged to re-tokenise the content data before a subsequent processing step;
  tokenising a content data contained within an input electronic file into a tagged generic representation of the content data, regardless of a language syntax used in the content data, the tagged generic representation of the content data specifying a validator function to use in validating the tagged generic representation of the content data;
  content-managing the tagged generic representation of the content data to apply a predetermined content management policy to the tagged generic representation of the content data to form content-managed content data, the content-managed tagged generic content data omitting a portion of the tagged generic representation of the content data based on the predetermined content management policy;
  validating the content-managed content data represented in the tagged generic representation to ensure said content-managed content data conforms to any predefined limits and rules applied to each form of content data appearing in the content data of the input electronic file, to form validated content-managed content data; and
  outputting a substitute output electronic file derived from the validated content-managed content data.

36. The one or more tangible storage means of claim 35, wherein the non-transitory computer code is operative to regenerate only known-good content data in the tagged generic representation of the content data, the validated content-managed content data, or the substitute output electronic file.

37. The one or more tangible storage means of claim 35, wherein the predefined limits and rules pertain to a form of the input electronic file.

38. The one or more tangible storage means of claim 35, wherein the tagged generic representation of the content data includes one or more tag(s) to represent the content data.

39. The one or more tangible storage means of claim 35, wherein the predetermined content management policy identifies the portion of the tagged generic representation of the content data as potentially malicious content.

* * * * *